(12) United States Patent
Yamakawa et al.

(10) Patent No.: US 9,866,068 B2
(45) Date of Patent: *Jan. 9, 2018

(54) ELECTRIC POWER TRANSMISSION SYSTEM WITH POWER TRANSMISSION AND RECEIVING ANTENNAS

(71) Applicant: EQUOS RESEARCH CO., LTD., Tokyo (JP)

(72) Inventors: Hiroyuki Yamakawa, Hokkaido (JP); Yasuo Ito, Hokkaido (JP); Kenichiro Sato, Tokyo (JP)

(73) Assignee: EQUOS RESEARCH CO., LTD., Tokyo (JP)

( * ) Notice: Subject to any disclaimer, the term of this patent is extended or adjusted under 35 U.S.C. 154(b) by 398 days.

This patent is subject to a terminal disclaimer.

(21) Appl. No.: 14/400,745

(22) PCT Filed: Aug. 30, 2013

(86) PCT No.: PCT/JP2013/073309
§ 371 (c)(1),
(2) Date: Nov. 12, 2014

(87) PCT Pub. No.: WO2014/050430
PCT Pub. Date: Apr. 3, 2014

(65) Prior Publication Data
US 2015/0123485 A1    May 7, 2015

(30) Foreign Application Priority Data

Sep. 28, 2012  (JP) .................................. 2012-218323

(51) Int. Cl.
*H02J 50/12*          (2016.01)
*H02J 17/00*          (2006.01)
(Continued)

(52) U.S. Cl.
CPC ............... *H02J 17/00* (2013.01); *B60L 11/18* (2013.01); *B60L 11/182* (2013.01); *H01F 3/10* (2013.01);
(Continued)

(58) Field of Classification Search
CPC . H02J 5/005; H02J 7/025; H02J 17/00; B60L 11/182
See application file for complete search history.

(56) References Cited

U.S. PATENT DOCUMENTS

2009/0322307 A1* 12/2009 Ide ........................ H02J 5/005
                                                          323/355
2010/0110741 A1   5/2010 Lin et al.
(Continued)

FOREIGN PATENT DOCUMENTS

CN        102474136 A       5/2012
JP       A 2009-501510      1/2009
(Continued)

OTHER PUBLICATIONS

May 11, 2016 Search Report issued in European Patent Application No. 13841085.7.
(Continued)

*Primary Examiner* — Rexford Barnie
*Assistant Examiner* — David Shiao
(74) *Attorney, Agent, or Firm* — Oliff PLC

(57) ABSTRACT

An electric power transmission system may include: a power transmission antenna that constitutes a series resonator with an inductance component of L1 and a capacitance component of C1, and to which AC power is input; a power receiving antenna that constitutes a series resonator with an inductance component of L2 and a capacitance component of C2, and which receives electromagnetic energy from the
(Continued)

power transmission antenna via electromagnetic fields; a rectifying unit that rectifies an output of the power receiving antenna to output DC power; and a load to which an output of the rectifying unit is input, wherein, when a coupling coefficient between the power transmission antenna and the power receiving antenna is k, if load resistance value R is used in a range that satisfies $R_{min} \leq R \leq R_{max}$, the following relationships are established:

$$L_1 C_1 = L_2 C_2 \text{ and} \quad (2)$$

$$\frac{L_1}{C_1} > \frac{L_2}{C_2} \text{ and} \quad (6)$$

$$R_{min} \leq k\sqrt{\frac{L_2}{C_2}} \leq R_{max}. \quad (8)$$

6 Claims, 20 Drawing Sheets

(51) Int. Cl.
| | | |
|---|---|---|
| B60L 11/18 | (2006.01) | |
| H01F 38/14 | (2006.01) | |
| H02J 7/00 | (2006.01) | |
| H01F 3/10 | (2006.01) | |
| H01F 5/02 | (2006.01) | |
| H01F 27/28 | (2006.01) | |
| H02J 7/02 | (2016.01) | |
| H02J 5/00 | (2016.01) | |

(52) U.S. Cl.
CPC .......... H01F 5/02 (2013.01); H01F 27/2823 (2013.01); H01F 38/14 (2013.01); H02J 7/00 (2013.01); H02J 7/025 (2013.01); H02J 50/12 (2016.02); H01F 27/2871 (2013.01); H02J 5/005 (2013.01)

(56) References Cited

U.S. PATENT DOCUMENTS

| | | | |
|---|---|---|---|
| 2010/0213770 A1* | 8/2010 | Kikuchi | H01Q 1/248 307/104 |
| 2010/0219696 A1 | 9/2010 | Kojima | |
| 2011/0049995 A1 | 3/2011 | Hashiguchi | |
| 2011/0163609 A1 | 7/2011 | Wada et al. | |
| 2011/0285210 A1* | 11/2011 | Lemmens | H02J 5/005 307/104 |
| 2012/0161696 A1* | 6/2012 | Cook | B60L 11/182 320/108 |
| 2012/0218068 A1 | 8/2012 | Yamakawa et al. | |
| 2012/0235636 A1* | 9/2012 | Partovi | H02J 7/025 320/108 |
| 2015/0054350 A1* | 2/2015 | Covic | H01F 38/14 307/104 |
| 2015/0180285 A1 | 6/2015 | Yamakawa et al. | |

FOREIGN PATENT DOCUMENTS

| | | |
|---|---|---|
| JP | A 2010-63324 | 3/2010 |
| JP | A 2010-068657 | 3/2010 |
| JP | A 2010-073976 | 4/2010 |
| JP | A 2011-50140 | 3/2011 |
| JP | A 2011-142748 | 7/2011 |
| WO | WO 2007/008646 A2 | 1/2007 |

OTHER PUBLICATIONS

Nov. 19, 2013 Search Report issued in International Patent Application No. PCT/JP2013/073309.

* cited by examiner

Coupling coefficient K

<u>Equivalent circuit</u>

Diagram illustrating winding pattern of conductive line 400

(A)          (B)

(C)

(A)

(B)

Diagram illustrating winding pattern of conductive line 400

(A)

(B)

(C)

(A)

(B)

ELECTRIC POWER TRANSMISSION SYSTEM WITH POWER TRANSMISSION AND RECEIVING ANTENNAS

TECHNICAL FIELD

The present invention relates to an electric power transmission system that uses a magnetic resonance method to wirelessly transmit or receive electric power.

BACKGROUND ART

In recent years, development of technology for wirelessly transmitting electric power (electric energy) without using power supply cords and the like has become popular. Among methods for wirelessly transmitting electric power, the technique called a magnetic resonance method is gaining particular attention. The magnetic resonance method was proposed by a research group at the Massachusetts Institute of Technology in 2007. The related technology is disclosed in Patent Document 1 (JP2009-501510A), for example.

In a wireless electric power transmission system of the magnetic resonance method, a resonance frequency of a power transmission antenna is equal to a resonance frequency of a power receiving antenna; the antennas with a high Q-value (100 or more) are used. Therefore, from the power transmission antenna to the power receiving antenna, energy can be efficiently transmitted. One of major features is that the power transmission distance can be from several tens of centimeters to several meters.

Studies have been under way on how to apply the above-described magnetic resonance-type wireless electric power transmission system to a process of charging vehicle-mounted batteries, such as those of an electric vehicle (EV) or a hybrid electric vehicle (HEV). The use of such a wireless system for the above vehicles would eliminate the need to handle power supply connectors, power supply lines, and the like for the supply of electric power to the vehicles.

For example, what is disclosed in Patent Document 2 (JP2010-68657A) is one antenna that is mounted in a bottom surface portion of a moving object such as an electric vehicle, with another antenna provided on the ground to wirelessly transmit electric power to charge a battery of the electric vehicle with the transmitted electric power.

Several proposals have been made on a specific configuration of an antenna used in the magnetic resonance-type wireless electric power transmission system. For example, as for the configuration of communication coils that are provided in a power feeding circuit and a power receiving circuit in a wireless electric power transmission device that wirelessly transmits electric power from the power feeding circuit to the power receiving circuit, what is disclosed in Patent Document 3 (JP2010-73976A) is the configuration of the communication coils of the wireless electric power transmission device characterized by including: a printed board made of a material with a relative permittivity of more than 1; a primary coil that is provided on a first layer of the printed board and is formed as a conductive pattern making at least one loop; and a resonance coil that is provided on a second layer of the printed board and is formed as a spiral conductive pattern.

Patent Document 1: JP2009-501510A
Patent Document 2: JP2010-68657A
Patent Document 3: JP2010-73976A

SUMMARY OF THE INVENTION

Problems to be Solved by the Invention

In the case where the magnetic resonance-type electric power transmission system is applied to a process of charging vehicle-mounted batteries such as those of an electric vehicle (EV) or a hybrid electric vehicle (HEV), a power receiving-side load is a battery. In the case where the battery is charged, after shifting to a constant voltage charging mode, input impedance is changed by charging power because the voltage of the battery is constant.

When the charging power for the battery is large, the input impedance is low. When the charging power is small, the input impedance is high.

In terms of efficiency, it is desirable that the impedance of a power receiving-side antenna be set close to the input impedance corresponding to the charging power for the battery.

Meanwhile, in terms of efficiency, the input impedance to a power transmission antenna when seen from a power transmission-side power supply should be as high as possible. The reason is that loss occurs in proportion to the square of the current due to the internal resistance of the power supply.

However, in the conventional electric power transmission system disclosed in Patent Document 2, the above facts are not taken into account in setting the circuit constants of the power transmission antenna and power receiving antenna. Therefore, the problem is that the transmission of electric power is not necessarily efficient.

In the case where the magnetic resonance-type electric power transmission system is used for a process of supplying electric power to vehicles such as an electric vehicle (EV) or a hybrid electric vehicle (HEV), the power transmission antenna may be buried under the ground, and the power receiving antenna may be laid on a bottom surface portion of a vehicle.

The problem is that, if an antenna having the configuration disclosed in Patent Document 3 is installed in the bottom portion of the vehicle that is a metal body, a magnetic field leaking from the antenna during the transmission of electric power enters the metal body, and the bottom portion of the vehicle is heated by the current induced by the magnetic field inside the metal body.

Another problem is that the electric power transmission efficiency of the system is curbed by the magnetic field that enters the metal body after leaking from the antenna during the transmission of electric power.

Means for Solving the Problems

To solve the above problems, an electric power transmission system of the present invention is characterized by at least including: a power transmission antenna that constitutes a series resonator with an inductance component of $L_1$ and a capacitance component of $C_1$, and to which AC power is input; a power receiving antenna that constitutes a series resonator with an inductance component of $L_2$ and a capacitance component of $C_2$, and which receives electromagnetic energy from the power transmission antenna via electromagnetic fields; a rectifying unit that rectifies an output of the power receiving antenna to output DC power; and a load to which an output of the rectifying unit is input, wherein, at times including when a coupling coefficient between the power transmission antenna and the power receiving antenna is k, if load resistance value R is used in a range that satisfies $R_{min} \leq R \leq R_{max}$, the following relationships are established:

[Formula 2]
$$L_1 C_1 = L_2 C_2 \text{ and} \quad (2)$$

[Formula 6]
$$\frac{L_1}{C_1} > \frac{L_2}{C_2} \text{ and} \quad (6)$$

[Formula 8]
$$R_{min} \leq k\sqrt{\frac{L_2}{C_2}} \leq R_{max}. \quad (8)$$

In that manner, the above relationships are established.

The electric power transmission system of the present invention is characterized by including

[Formula 9]
$$k\sqrt{\frac{L_2}{C_2}} = \frac{R_{min} + R_{max}}{2}. \quad (9)$$

In that manner, the above relationship is established.

An electric power transmission system of the present invention is characterized by at least including: a power transmission antenna that constitutes a series resonator with an inductance component of $L_1$ and a capacitance component of $C_1$, and to which AC power is input; a power receiving antenna that constitutes a series resonator with an inductance component of $L_2$ and a capacitance component of $C_2$, and which receives electromagnetic energy from the power transmission antenna via electromagnetic fields; a rectifying unit that rectifies an output of the power receiving antenna to output DC power; and a load to which an output of the rectifying unit is input, wherein, at times including when a coupling coefficient between the power transmission antenna and the power receiving antenna is k, if there are n modes in which different values of electric power are used to transmit electric power from the power transmission antenna to the power receiving antenna, if a load resistance value during transmission of electric power in an $h^{th}$ mode (h=1, 2, . . . , n) is $R_h$, and if a maximum resistance value $R_h$ is represented by $R_{hmax}$ and a minimum resistance value $R_h$ by $R_{hmin}$, the following relationships are established:

[Formula 2]
$$L_1 C_1 = L_2 C_2 \text{ and} \quad (2)$$

[Formula 6]
$$\frac{L_1}{C_1} > \frac{L_2}{C_2} \text{ and} \quad (6)$$

[Formula 12]
$$R_{hmin} \leq k\sqrt{\frac{L_2}{C_2}} \leq R_{hmax}. \quad (12)$$

In that manner, the above relationships are established.

The electric power transmission system of the present invention is characterized by including

[Formula 11]
$$k\sqrt{\frac{L_2}{C_2}} = \frac{\sum_{h=1}^{n} R_h}{n}. \quad (11)$$

In that manner, the above relationship is established.

The electric power transmission system of the present invention is characterized in that the power transmission antenna is non-directional.

The electric power transmission system of the present invention is characterized in that the power receiving antenna is directional.

Advantages of the Invention

In the electric power transmission system of the present invention, the circuit constants of the power transmission antenna and power receiving antenna are set in such a way as to satisfy the above formulae (2), (6), and (7). Therefore, when the battery 204 is charged in the power receiving-side system, electric power can be efficiently transmitted.

Moreover, in the electric power transmission system of the present invention, even when the power receiving antenna is mounted on the bottom surface of the vehicle, it is possible to reduce the magnetic fields entering the metal body of the bottom portion of the vehicle after leaking from the power receiving antenna during the transmission of electric power, because at least the power receiving antenna is directional. As a result, it is possible to prevent the heating of the bottom portion of the vehicle and to improve the power transmission efficiency of the system.

BEST MODE FOR CARRYING OUT THE INVENTION

Figure 1:
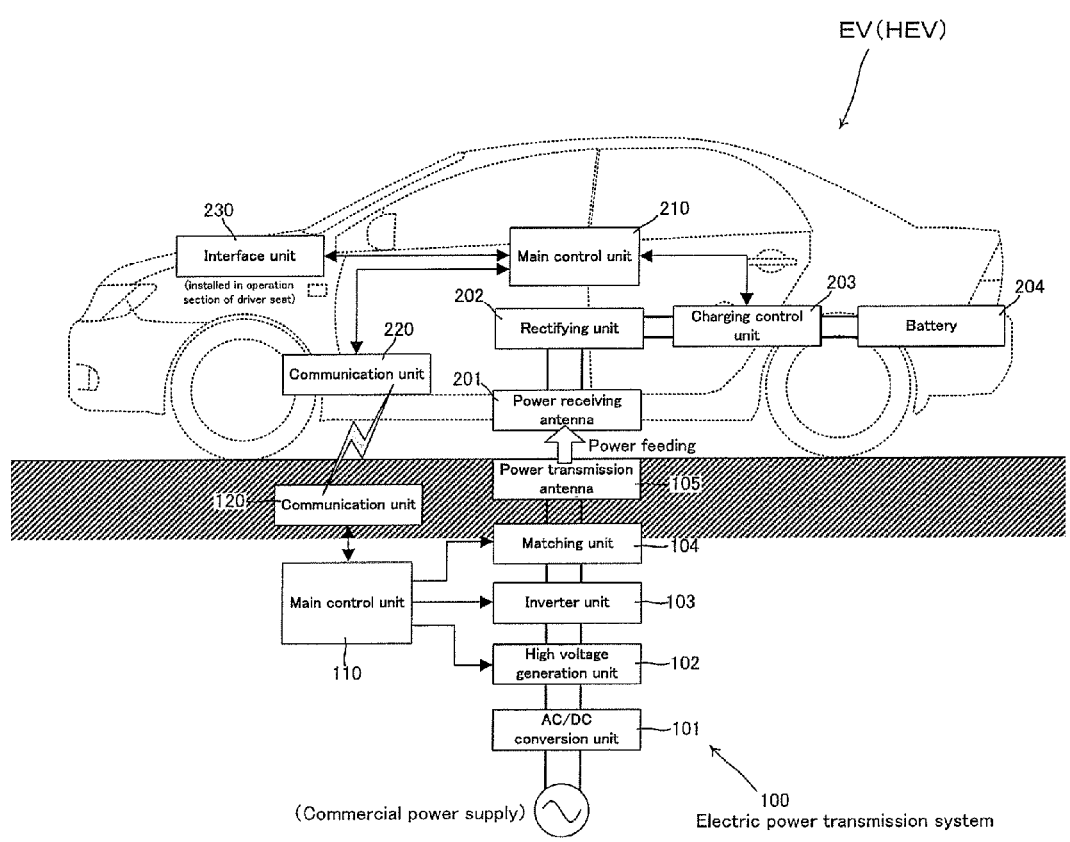
FIG. 1 is a block diagram of an electric power transmission system according to an embodiment of the present invention.

Hereinafter, an embodiment of the present invention will be described with reference to the accompanying drawings. FIG. 1 is a block diagram of an electric power transmission system according to an embodiment of the present invention. Incidentally, an antenna of the present invention can be applied to both a power receiving antenna and power transmission antenna that make up the electric power transmission system. However, in the embodiment described below, what is described is an example in which the antenna of the present invention is applied to the power receiving antenna.

An electric power transmission system that uses the antenna of the present invention is expected to be a system that charges vehicles such as an electric vehicle (EV) or a hybrid electric vehicle (HEV), for example. In the electric power transmission system, electric power is transmitted to the above vehicle in a non-contact manner. The electric power transmission system is therefore provided in a parking space where the vehicle can be stopped. In the parking space, which is a vehicle-charging space, a power transmission antenna 105 and other components are buried under the ground. A user of the vehicle parks the vehicle in the parking space in which the electric power transmission system is provided, in such a way that a power receiving antenna 201 mounted on the vehicle faces the power transmission antenna 105. Accordingly, the vehicle receives electric power from the electric power transmission system. When the vehicle is parked in the parking space, the vehicle-mounted power receiving antenna 201 is positioned relative to the power transmission antenna 105 in such a way as to achieve the highest transmission efficiency.

In the electric power transmission system, when electric power is efficiently transmitted from the power transmission antenna 105 of the electric power transmission system 100 to the power receiving antenna 201 of a power receiving side system 200, a resonance frequency of the power transmission antenna 105 becomes equal to a resonance frequency of the power receiving antenna 201. Therefore, from the power transmission antenna to the power receiving antenna, energy is efficiently transmitted.

In the electric power transmission system 100, an AC/DC conversion unit 101 is a converter that converts input commercial power to a constant direct current. An output of the AC/DC conversion unit 101 is stepped up in a high voltage generation unit 102 to a predetermined voltage, or is subjected to other processes. The settings of a voltage generated by the voltage adjustment unit 102 can be controlled from a main control unit 110.

Figure 2:
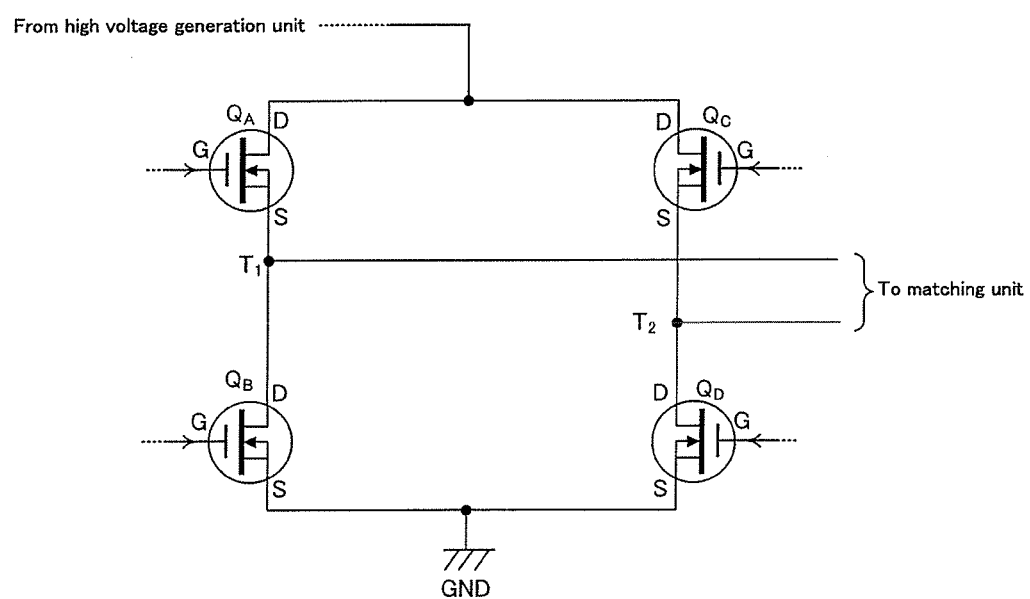
FIG. 2 is a diagram showing an inverter unit of an electric power transmission system.

An inverter unit 103 generates a predetermined AC voltage from a high voltage supplied from the high voltage generation unit 102, and inputs the AC voltage to a matching unit 104. FIG. 2 is a diagram showing the inverter unit of the electric power transmission system. As shown in FIG. 2, for example, the inverter unit 103 includes four field-effect transistors (FET) $Q_A$ to $Q_D$, which are connected in full-bridge configuration.

According to the present embodiment, between a connection portion T1, which is located between the switching elements $Q_A$ and $Q_B$ connected in series, and a connection portion T2, which is located between the switching elements $Q_C$ and $Q_D$ connected in series, the matching unit 104 is connected. When the switching elements $Q_A$ and $Q_D$ are ON, the switching elements $Q_B$ and $Q_C$ are OFF. When the switching elements $Q_B$ and $Q_C$ are ON, the switching elements $Q_A$ and $Q_D$ are OFF. As a result, a rectangular wave of AC voltage is generated between the connection portions T1 and T2. Incidentally, in the present embodiment, the frequency range of a rectangular wave generated by the switching of each of the switching elements is from about 20 kHz to several thousand kilohertz.

To the switching elements $Q_A$ to $Q_D$ that make up the above inverter unit 103, a drive signal is input from the main control unit 110. Moreover, the frequency for driving the inverter unit 103 can be controlled from the main control unit 110.

The matching unit 104 includes a passive element having a predetermined circuit constant. An output of the inverter unit 103 is input to the matching unit 104. An output of the matching unit 104 is supplied to the power transmission antenna 105. The circuit constant of the passive element that constitutes the matching unit 104 can be adjusted based on instructions from the main control unit 110. The main control unit 110 gives instructions to the matching unit 104 in such a way that the power transmission antenna 105 and the power receiving antenna 201 resonate with each other. Incidentally, the matching unit 104 is not necessarily required.

The power transmission antenna 105 includes a coil having an inductive reactance component. The power transmission antenna 105 resonates with the vehicle-mounted power receiving antenna 201 that is disposed in such a way as to face the power transmission antenna 105. Therefore, electric energy output from the power transmission antenna 105 is transmitted to the power receiving antenna 201.

The main control unit 110 of the electric power transmission system 100 is a general-purpose information processing unit that includes a CPU, a ROM, which keeps programs that run on the CPU, a RAM, which serves as a work area for the CPU, and the like. The main control unit 110 works cooperatively with each of components connected to the main control unit 110 shown in the diagram.

A communication unit 120 wirelessly communicates with a vehicle-side communication unit 220, and therefore can exchange data with the vehicle. The data received by the communication unit 120 is transferred to the main control unit 110. Moreover, the main control unit 110 can transmit predetermined information to the vehicle via the communication unit 120.

The components provided in the vehicle will be described. In the vehicle's power receiving-side system, the power receiving antenna 201 resonates with the power transmission antenna 105 to receive electric energy output from the power transmission antenna 105. The power receiving antenna 201 is mounted on a bottom surface portion of the vehicle.

The AC power received by the power receiving antenna 201 is rectified by a rectifying unit 202. The rectified power is accumulated in a battery 204 via a charging control unit 203. The charging control unit 203 controls the charging of the battery 204 on the basis of instructions from a main control unit 210. More specifically, the output of the rectifying unit 202 is stepped up or down to a predetermined voltage value by the charging control unit 203 before being accumulated in the battery 204. The charging control unit 203 is so configured as to manage a remaining level of the battery 204 and do other processes.

The main control unit 210 is a general-purpose information processing unit that includes a CPU, a ROM, which keeps programs that run on the CPU, a RAM, which serves as a work area for the CPU, and the like. The main control unit 210 works cooperatively with each of components connected to the main control unit 210 shown in the diagram.

An interface unit 230 is provided in a driver seat portion of the vehicle. The interface unit 230 provides predetermined information and the like to a user (driver), or accepts a user's operation or input. The interface unit 230 includes a display device, buttons, a touch panel, a speaker, and the like. After a predetermined operation is performed by a user, operation data is transmitted from the interface unit 230 to the main control unit 210, which then processes the operation data. To present predetermined information to a user, from the main control unit 210 to the interface unit 230, display instruction data is transmitted to display the predetermined information.

The vehicle-side communication unit 220 wirelessly communicates with the power transmission-side communication unit 120, and therefore can exchange data with the power transmission-side system. The data received by the communication unit 220 is transferred to the main control unit 210. Moreover, the main control unit 210 can transmit predetermined information to the power transmission-side system via the communication unit 220.

A user who wants to receive electric power from the electric power transmission system parks the vehicle in the parking space in which the above power transmission-side system is provided. The user inputs, via the interface unit 230, a request for charging. In response to the request, the main control unit 210 acquires a remaining level of the battery 204 from the charging control unit 203, and calculates an amount of electric power necessary for charging the battery 204. The information that indicates the calculated amount of electric power and makes a request for the transmission of electric power is transmitted from the vehicle-side communication unit 220 to the power transmission-side system's communication unit 120. After receiving the information, the power transmission-side system's main control unit 110 controls the high voltage generation unit 102, the inverter unit 103, and the matching unit 104 to transmit electric power to the vehicle.

The specific configuration of an antenna used in the electric power transmission system 100 having the above-described configuration will be described. The following describes an example in which the configuration of the present invention is applied to the power receiving antenna 201. The antenna of the present invention may also be applied to the power transmission antenna 105.

Figure 3:
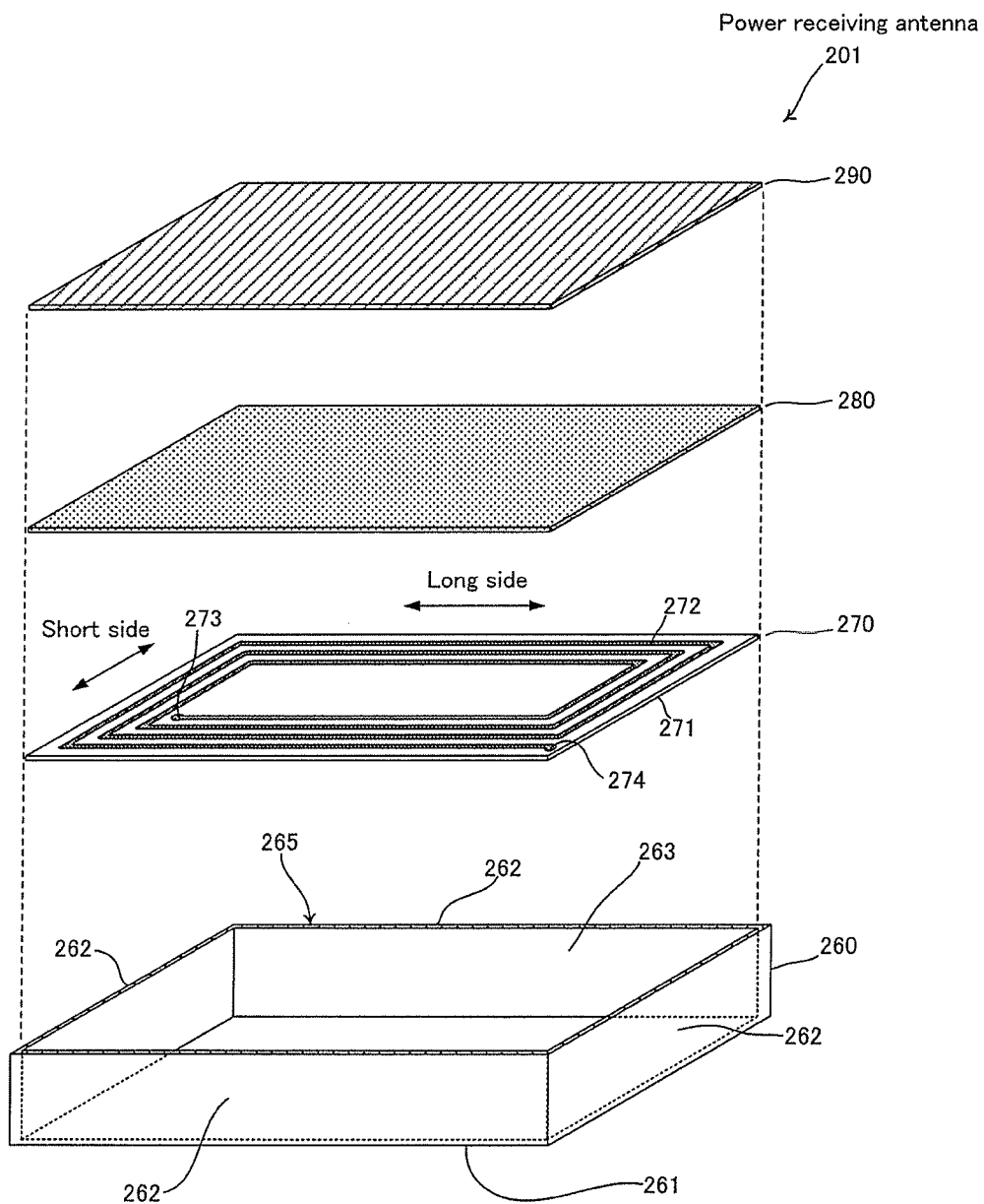
FIG. 3 is an exploded perspective view of a power transmission antenna 105 (power receiving antenna 201).
Figure 4:
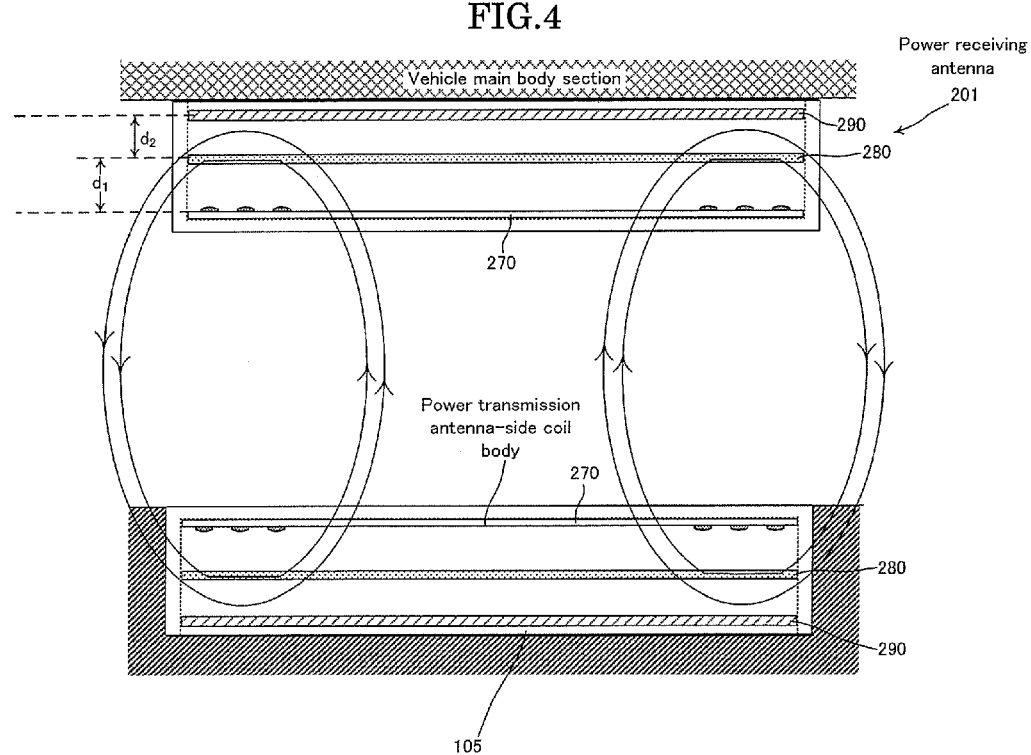
FIG. 4 is a schematic cross-sectional view showing how electric power is transmitted by power receiving antenna 201/power receiving antenna 201.

FIG. 3 is an exploded perspective view of the power transmission antenna 105 (power receiving antenna 201) of the embodiment of the present invention. FIG. 4 is a schematic cross-sectional view showing how electric power is transmitted by power transmission antenna 105/power receiving antenna 201 according to the embodiment of the present invention. The arrows in FIG. 4 schematically show lines of magnetic force.

Incidentally, in the embodiment described below, what is described is an example in which a coil body 270 of the power transmission antenna 105/power receiving antenna 201 is in the shape of a rectangular plate. However, the antenna of the present invention is not limited to a coil of such a shape. For example, the coil body 270 may be in the shape of a circular plate or the like. The coil body 270 functions as a magnetic resonance antenna section of the power transmission antenna 105/power receiving antenna 201. The "magnetic resonance antenna section" includes not only an inductance component of the coil body 270 but also a capacitance component based on floating capacitance thereof or a capacitance component based on a capacitor that is intentionally added.

Incidentally, in the electric power transmission system 100 of the present invention, the circuit constants (inductance and capacitance components) of the power transmission antenna 105 are intentionally configured in such a way as to be different from the circuit constants of the power receiving antenna 201. This configuration is aimed at improving the transmission efficiency. In order to make the circuit constants of the power transmission antenna 105 different from the circuit constants of the power receiving antenna 201, the coil bodies 270 of the antennas may have almost the same shape but be different in size, for example.

A case body 260 is used to house the coil body 270, which includes an inductive reactance component of the power receiving antenna 201. The case body 260 is made of, for example, resin such as polycarbonate, and is in the shape of a box with an opening. From each side of a rectangular bottom plate section 261 of the case body 260, a side plate section 262 is provided in such a way as to extend in a direction perpendicular to the bottom plate section 261. On an upper side of the case body 260, an upper opening 263 is formed in such a way as to be surrounded by the side plate sections 262. The power receiving antenna 201 packaged in the case body 260 is mounted on a vehicle's main body section at the upper opening 263's side. In order to attach the case body 260 to the vehicle's main body section, any conventional, well-known method may be used. Incidentally, in order to make an improvement in the attachment of the case body 260 to the vehicle's main body section, a flange member or the like may be provided around the upper opening 263.

The coil body 270 includes a base 271, which is made of glass epoxy and is in the shape of a rectangular plate, and a conductive section 272, which is formed on the base 271 and is in a spiral shape. To an inner peripheral-side first end portion 273 and outer peripheral-side second end portion 274 of the spiral conductive section 272, conductive lines (not shown) are electrically connected. Therefore, the electric power received by the power receiving antenna 201 can be introduced to the rectifying section 202. The coil body 270 is placed on the rectangular bottom plate section 261 of the case body 260, and is fixed to the bottom plate section 261 through a suitable fixing means.

On the coil body 270, a ferrite substrate 280 is disposed a first distance $d_1$ away from the coil body 270. It is desirable that the ferrite substrate 280 be made of a material that is large in specific resistance and magnetic permeability and small in magnetic hysteresis. The ferrite substrate 280 is fixed to the case body 260 through an appropriate means in such a way as to be disposed with a space of first distance $d_1$ above the coil body 270. Such a layout helps to increase the rate at which lines of magnetic force generated on the power transmission antenna 105's side are transmitted through the ferrite substrate 280, thereby reducing the impact of metal objects making up the vehicle's main body section on the lines of magnetic force during the transmission of electric power from the power transmission antenna 105 to the power receiving antenna 201.

As for the upper opening 263 of the case body 260, an aluminum substrate 290 that is in the shape of a rectangular plate is placed a second distance $d_2$ above the ferrite substrate 280 in such a way as to cover the upper opening 263. As for the metal material used for the aluminum substrate 290, a metal other than aluminum may be used.

According to the present embodiment, the aluminum substrate 290 is disposed in such a way as to cover the upper opening 263. Therefore, it is possible to reduce the effects of the vehicle main body's metal section on the coil body 270, and to determine the characteristics of the power receiving antenna 201 as an antenna. According to the present embodiment, the characteristics of the antenna have been determined. Therefore, regardless of the type of a vehicle on which the power receiving antenna 201 is mounted, the same power transmission characteristics can be expected. As a result, the versatility of the antenna is expanded.

According to the present embodiment, the power receiving antenna 201 is mounted in the vehicle's main body through a vehicle body mounting section 265, which is located at the upper opening 263. As for the configuration of the vehicle body mounting section 265, a conventional, well-known one may be appropriately used. Incidentally, in order to make an improvement in the attachment of the case body 260 to the vehicle's main body, a flange member or the like may be provided around the upper opening 263.

As described above, the antenna of the present invention includes the coil body 270, which is made by forming a predetermined conductive section 272 on the insulating base 271 having a main surface; the ferrite substrate 280, which is disposed above the coil body 270 with a first distance $d_1$ away from the coil body 270; and the aluminum substrate 290, which is disposed above the ferrite substrate 280 with a second distance $d_2$ away from the ferrite substrate 280; and the vehicle body mounting section 265, which is disposed on the aluminum substrate 290.

Figure 5:
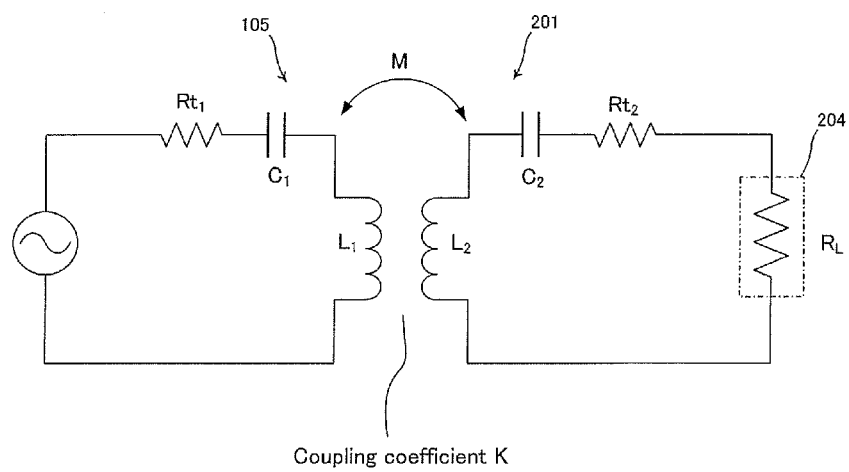
FIG. 5 is a diagram showing an equivalent circuit of an electric power transmission system 100 according to an embodiment of the present invention.

The following describes the circuit constants (inductance and capacitance components) of the power transmission antenna 105/power receiving antenna 201 having the above configuration. FIG. 5 is a diagram showing an equivalent circuit of the electric power transmission system 100 according to the embodiment of the present invention.

In the equivalent circuit shown in FIG. 5, an inductance component of the power transmission antenna 105 is represented by $L_1$, a capacitance component thereof by $C_1$, and a resistance component thereof by $Rt_1$. An inductance component of the power receiving antenna 201 is represented by $L_2$, a capacitance component thereof by $C_2$, and a resistance component thereof by $Rt_2$. Mutual inductance between the power transmission antenna 105 and the power receiving antenna 201 is represented by M. Internal resistance of the battery 204 is represented by $R_L$. A coupling coefficient between the power transmission antenna 105 and the power receiving antenna 201 is represented by k.

In the case of the present embodiment, suppose that the power transmission antenna 105 constitutes a series resonator having the inductance component $L_1$ and the capacitance component $C_1$, and that the power receiving antenna 201 constitutes a series resonator having the inductance component $L_2$ and the capacitance component $C_2$.

In the case of magnetic resonance-type power transmission, when electric power is efficiently transmitted from the power transmission antenna 105 of the electric power transmission system 100 to the power receiving antenna 201 of the power receiving-side system 200, the resonance frequency of the power transmission antenna 105 becomes equal to the resonance frequency of the power receiving antenna 201. Therefore, from the power transmission antenna to the power receiving antenna, energy can be efficiently transmitted. The condition for the power transmission is expressed by the following formula (1).

[Formula 1]

$$\frac{1}{2\pi\sqrt{L_1 C_1}} = \frac{1}{2\pi\sqrt{L_2 C_2}} \tag{1}$$

When the formula is expressed as only the relationship between the inductance component $L_1$, the capacitance component $C_1$, the inductance component $L_2$, and the capacitance component $C_2$, this formula can be summarized as the following formula (2).

[Formula 2]

$$L_1 C_1 = L_2 C_2 \tag{2}$$

The impedance of the power transmission antenna 105 is expressed by the following formula (3). The impedance of the power receiving antenna 201 is expressed by the following formula (4). Incidentally, in this specification, values defined by the following formulae (3) and (4) are defined as the impedance of the antennas.

[Formula 3]

$$k\sqrt{\frac{L_1}{C_1}} \tag{3}$$

[Formula 4]

$$k\sqrt{\frac{L_2}{C_2}} \tag{4}$$

In the power receiving-side system of the magnetic resonance-type electric power transmission system 100, after the battery 204 shifts to a constant voltage charging mode, the voltage of the battery 204 is constant. Accordingly, the input impedance is changed by charging power. When the charging power for the battery 204 is large, the input impedance is low. When the charging power is small, the input impedance is high. In terms of efficiency, it is desirable that the impedance of the power receiving-side power receiving antenna 201 be set close to the input impedance corresponding to the charging power for the battery 204.

Meanwhile, in terms of efficiency, the input impedance to the power transmission antenna 105 when seen from a power transmission-side power supply should be as high as possible. The reason is that loss occurs in proportion to the square of the current due to the internal resistance of the power supply.

Given the above facts, between the impedance of the power transmission antenna 105 represented by the formula (3) and the impedance of the power receiving antenna 201 represented by the formula (4), it is desirable that the relationship of the following formula (5) be achieved.

[Formula 5]

$$k\sqrt{\frac{L_1}{C_1}} > k\sqrt{\frac{L_2}{C_2}} \quad (5)$$

When the formula is expressed as only the relationship between the inductance component $L_1$, the capacitance component $C_1$, the inductance component $L_2$, and the capacitance component $C_2$, this formula can be summarized as the following formula (6).

[Formula 6]

$$\frac{L_1}{C_1} > \frac{L_2}{C_2} \quad (6)$$

As described above, in the electric power transmission system 100 of the present invention, the circuit constants of the power transmission antenna 105 and the circuit constants of the power receiving antenna 201 satisfy the above formulae (2) and (6). Therefore, during the process of charging the battery 204 in the power receiving-side system, electric power can be efficiently transmitted.

In terms of the inductance components in the circuit constants of the power transmission antenna 105 and power receiving antenna 201, in order to satisfy each of the relationships of the above formulae (2) and (6), the size and layout of the spiral conductive section 272 formed on the base 271 and auxiliary members such as magnetic bodies may be adjusted.

More specifically, in the case of the pattern of the conductive section 272 shown in FIG. 3, the long or short sides of the conductive section 272 of the power transmission antenna 105, or both, may be made longer than those of the power receiving antenna 201 to increase the total length of the conductive section 272; or the number of turns of the conductive section 272 of the power transmission antenna 105 may be made larger than that for the power receiving antenna 201; or a magnetic body such as ferrite may be added to an appropriate portion of the power transmission antenna 105.

Another embodiment of the present invention will be described. In the previous embodiment, both the power transmission antenna 105 and the power receiving antenna 201 are non-directional antennas.

The problem is that, if the power receiving antenna 201 is laid out in the bottom surface portion of the vehicle, a magnetic field leaking from the antenna during the transmission of electric power enters the metal body, and the bottom portion of the vehicle is heated by the current induced by the magnetic field inside the metal body. Accordingly, in the case of the present embodiment, a directional antenna is used particularly for the power receiving antenna 201. Incidentally, both the power transmission antenna 105 and the power receiving antenna 201 may be directional antennas.

In the electric power transmission system 100 having the above configuration, even when the power receiving antenna 201 is mounted on the bottom surface of the vehicle, it is possible to reduce the magnetic fields entering the metal body of the bottom portion of the vehicle after leaking from the power receiving antenna 201 during the transmission of electric power, because at least the power receiving antenna 201 is directional. As a result, it is possible to prevent the heating of the bottom portion of the vehicle and to improve the power transmission efficiency of the system.

The specific configuration of the directional antenna used in the electric power transmission system 100 of another embodiment will be described. Hereinafter, this antenna can be applied to both the power transmission antenna 105 and the power receiving antenna 201.

Incidentally, in the embodiment described below, the configuration of a coil that makes up the antenna will be described in detail. The antenna that transmits electric power using the magnetic resonance method includes not only an inductance component of the coil but also a capacitance component based on floating capacitance thereof or a capacitance component based on a capacitor that is intentionally added.

The antenna of the present embodiment is an antenna that includes a main coil MC and a plurality of sub-coils SC. The magnetic fields of the main coil MC are corrected by the magnetic fields of a plurality of sub-coils SC to realize the directional antenna.

Figure 6:
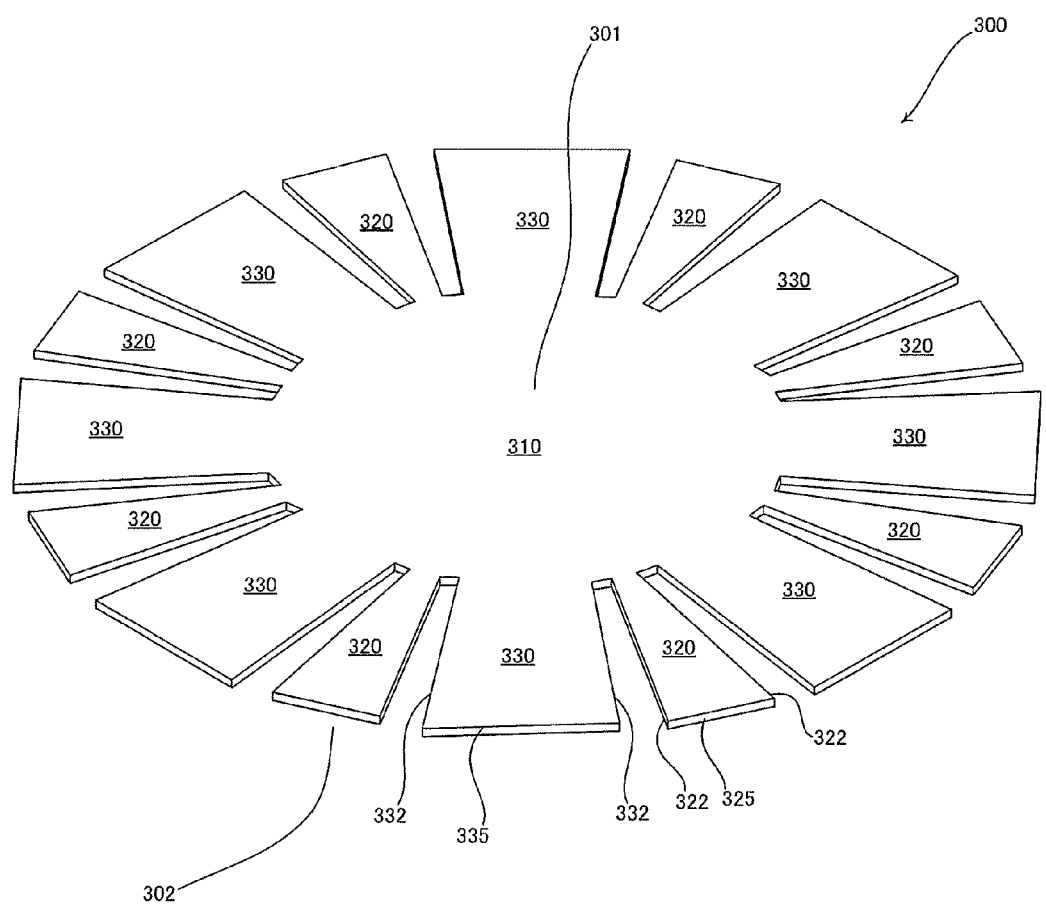
FIG. 6 is a diagram showing a substrate 300 used to form a coil of an antenna according to an embodiment of the present invention.

First, the configuration of a substrate 300, which is used to form a coil that constitutes the antenna, will be described. FIG. 6 is a diagram showing the substrate 300 used to form the coil of the antenna according to the embodiment of the present invention. Incidentally, in the present embodiment, what is described is an example in which the substrate 300 is substantially circular. However, the substrate 300 is not limited to this.

The substrate 300 is a substrate-like member having a first surface 301 and a second surface 302, which is the opposite side thereof. It is preferred that the substrate 300 be made of a material that is small in dielectric loss tangent, such as polycarbonate or polypropylene.

The substrate 300 includes a base section 310, which is a plate section that is substantially circular in shape; and a plurality of protruding pieces, which extend radially from the base section 310.

Figure 18:
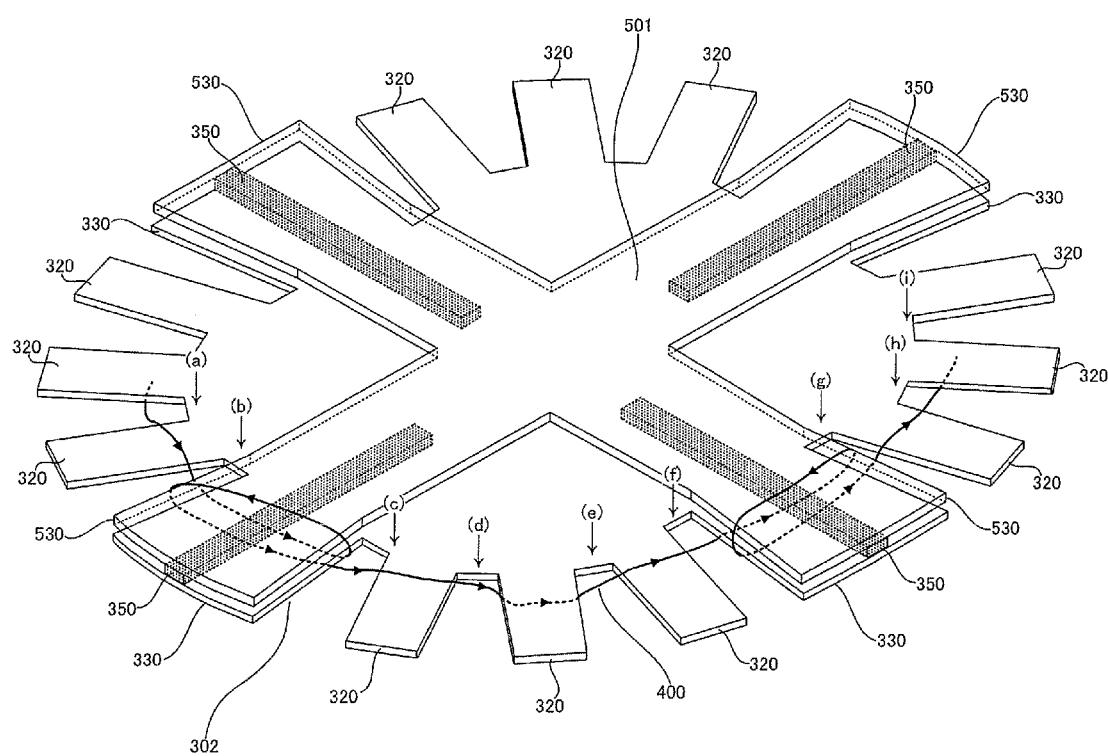
FIG. 18 is a diagram showing one example of a pattern when a conductive line 400 is wound on a substrate 300.

There are two types of protruding pieces, main coil formation protruding pieces 320 and sub-coil formation protruding pieces 330. On the periphery of the base section 310, the main coil formation protruding pieces 320 and the sub-coil formation protruding pieces 330 are alternately disposed. Incidentally, according to the present embodiment, what is described is an example in which the protruding pieces are alternately arranged on the periphery of the base section 310 in such a way that one main coil formation protruding piece 320 appears after one sub-coil formation protruding piece 330. However, the present invention is not limited to that example. For example, as shown in FIG. 18, which is described later, the protruding pieces may be alternately arranged on the periphery of the base section 310 in such a way that a set of any number of successive main coil formation protruding pieces 320 appears after one sub-coil formation protruding piece 330; or the protruding pieces may be alternately arranged on the periphery of the base section 310 in such a way that one main coil formation protruding piece 320 appears after a set of any number of successive sub-coil formation protruding pieces 330; or the protruding pieces may be arranged on the periphery of the base section 310 in such a way that a set of any number of successive main coil formation protruding pieces 320 and a set of any number of successive sub-coil formation protruding pieces 330 alternately appear. Those configurations are also within the scope of the present invention.

A main coil formation protruding piece 320 includes two side sections 322, which are substantially parallel to a direction of extending radially from the base section 310; and an edge section 325, which also is an outer edge of the substrate 300. A sub-coil formation protruding piece 330 includes two side sections 332, which are substantially parallel to the direction of extending radially from the base section 310; and an edge section 335, which also is an outer edge of the substrate 300.

A conductive line 400 goes across either the first surface 301 or second surface 302 of the main coil formation protruding piece 320. The main coil formation protruding piece 320 is used to hold the conductive line 400. Therefore, the shape of the main coil MC is maintained by the conductive line 400. The sub-coil formation protruding piece 330 is used for winding of the conductive line 400. Therefore, the shape of a sub-coil SC is maintained by the conductive line 400. A part of the conductive line 400 that is wound by the sub-coil formation protruding piece 330, and the conductive line 400 that is held by the sub-coil formation protruding piece 330 also function as a main coil MC.

Figure 7:
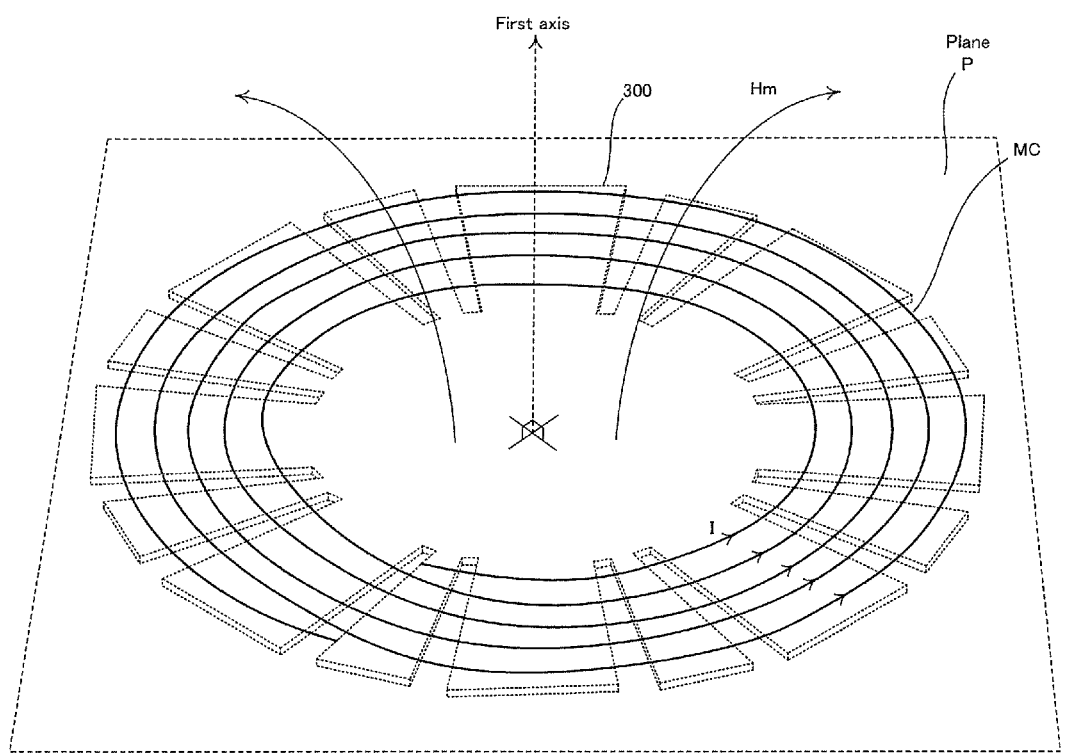
FIG. 7 is a schematic diagram showing an overview of a main coil formed on the substrate 300.
Figure 8:
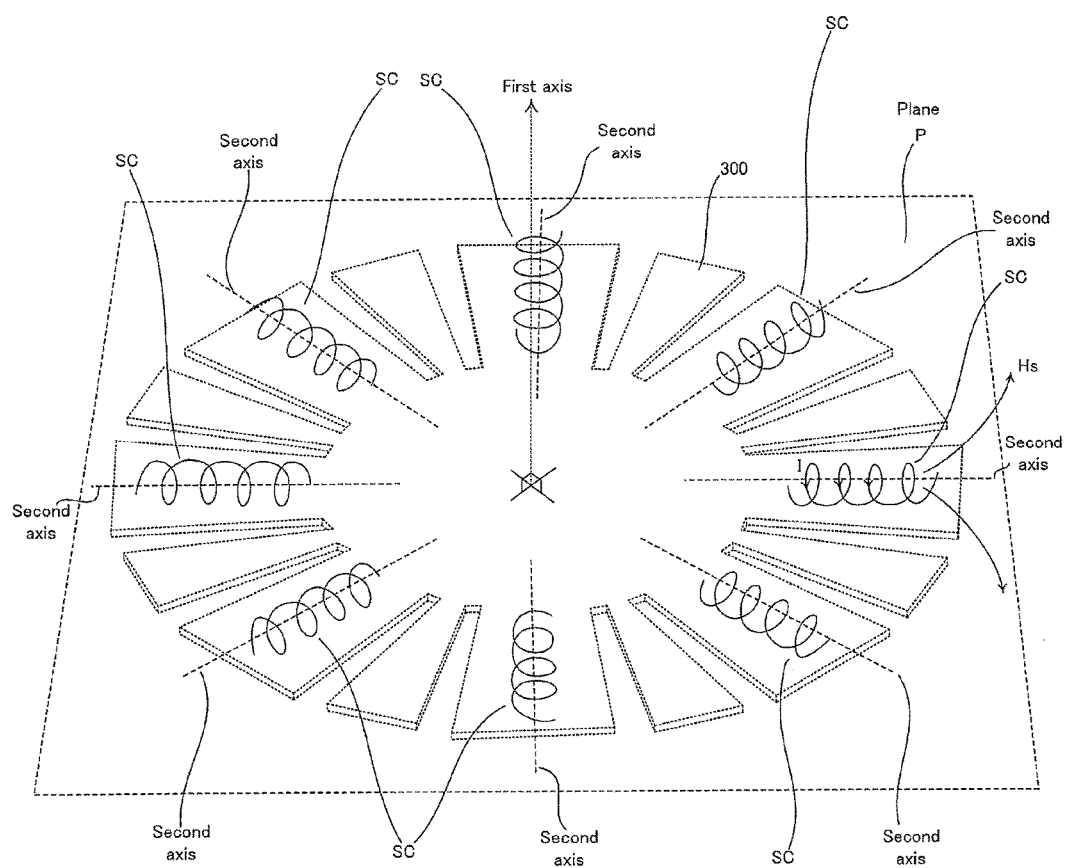
FIG. 8 is a schematic diagram showing an overview of sub-coils formed on the substrate 300.

The following provides an overview of the main coil MC and sub-coils SC that are formed by the conductive line 400 with the use of the substrate 300 as described above. FIG. 7 is a schematic diagram showing an overview of the main coil MC formed on the substrate 300. FIG. 8 is a schematic diagram showing an overview of sub-coils SC formed on the substrate 300.

In FIGS. 7 and 8, a plane P is a plane that contains the first surface 301 of the substrate 300. A first axis is a normal line of the plane P. A second axis is an axis contained within the plane P.

The main coil MC can be defined as being formed by a conductor that goes around the first axis.

In the example of FIG. 7, the main coil MC is formed as a conductor that is spirally shaped around the first axis within the plane P. However, the main coil MC may have any other structure as long as the main coil MC is formed as a conductor that goes around the first axis. For example, the main coil MC may be a solenoid-like coil that is wound around the first axis. The conductive section of the main coil MC may be a conductor printed on the substrate 300, instead of the conductive line.

As current I flows at a certain moment t, the main coil MC having the above configuration forms magnetic fields Hm in the directions shown in FIG. 7.

The sub-coils SC can be defined as being formed by a conductor that goes around the second axis.

What is shown in FIG. 8 is an example in which the sub-coils SC are formed as solenoid-like coils around the second axes. However, the sub-coils SC may have any other structure as long as the sub-coils SC are formed as a conductor that goes around the second axis.

In the antenna of the present embodiment, as the sub-coils SC described above, eight coils are provided. However, the number of sub-coils SC provided is not particularly limited.

The diagram shows magnetic fields Hs formed by the rightmost sub-coil SC in the diagram as current I flows at any moment t. Like this sub-coil SC, the other sub-coils SC form magnetic fields Hs in directions moving away from the first axis. The scalar quantities of the magnetic fields Hs of all the sub-coils SC are equal.

As for the magnetic fields that are formed when current I flows at a certain moment t, the antenna of the present embodiment generates synthetic magnetic fields, which are formed by combining the magnetic fields Hm, which are formed by the one main coil MC, and the magnetic fields Hs, which are formed by the eight sub-coils SC.

In the synthetic magnetic fields, on an upper surface side of the plane P, the magnetic fields Hm and Hs cancel each other. On the upper surface side of the plane P, the magnetic fields Hm and Hs strengthen each other. Accordingly, the magnetic fields generated from the entire antenna are the magnetic fields that spread on a lower surface side of the plane P. In this manner, the antenna becomes directional.

When the antenna of the present embodiment is applied to the power transmission antenna 105 and the power receiving antenna 201, it is possible to reduce the magnetic fields entering the metal body of the bottom portion of the vehicle after leaking from the antenna during the transmission of electric power, on the side that is mounted on the vehicle. As a result, it is possible to prevent the heating of the bottom portion of the vehicle and to improve the power transmission efficiency of the system.

Figure 9:
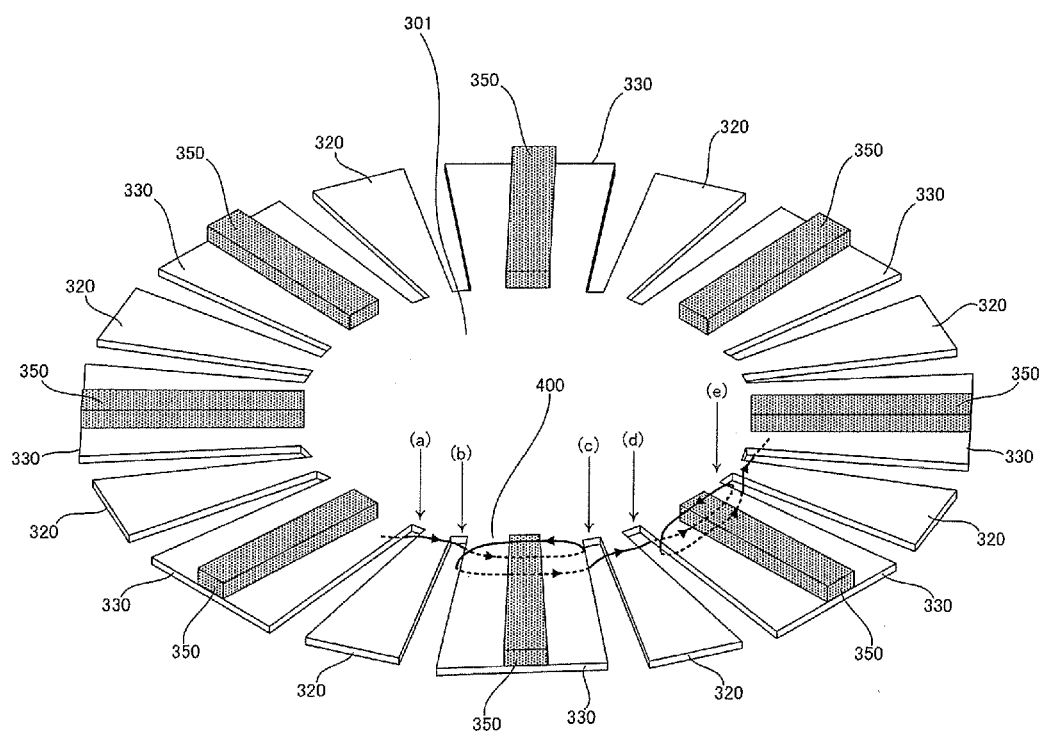
FIG. 9 is a diagram showing one example of a pattern when a conductive line 400 is wound on the substrate 300.

The following describes one example of a winding pattern of the conductive line 400 when the main coil MC and sub-coils SC defined as described above are formed with the substrate 300, with reference to FIG. 9.

According to the present embodiment, to the sub-coil formation protruding pieces 330, magnetic cores 350, which are made of a ferromagnetic material such as a ferrite material that is high in magnetic permeability and specific resistance, are attached. Then, in a pattern shown in FIG. 9, the conductive line 400 is wound. The conductive line 400 is a stranded wire, or a group of a plurality of conductor wires.

In FIG. 9, the arrow indicates the order the conductive line 400 is wound. For example, if the winding of the conductive line 400 starts at (a) in the diagram, the conductive line 400 is held on the first surface 301's side of the main coil formation protruding piece 320 between (a) and (b).

Between (b) and (c), the conductive line 400 is wound around the sub-coil formation protruding piece 330 in such a way as to make almost one and a half laps, from the second surface of the sub-coil formation protruding piece 330 to the first surface of the sub-coil formation protruding piece 330 and then to the second surface of the sub-coil formation protruding piece 330.

A coil that is wound around the sub-coil formation protruding piece 330 as described above forms magnetic fields as a sub-coil SC as a whole. A portion of the conductive line 400 that is wound on the second surface's side of the sub-coil formation protruding piece 330 also forms magnetic fields as a main coil MC.

In the winding pattern described above, the conductive line is wound in the following order: (c)→(d)→(e)→ . . . . The conductive line is wound in the above winding pattern until the conductive line makes one lap around the substrate 300 for all the protruding pieces of the substrate 300. After returning to (a), the conductive line is shifted in a direction in which the protruding pieces extend from the base section 310, before being wound around.

Figure 10:
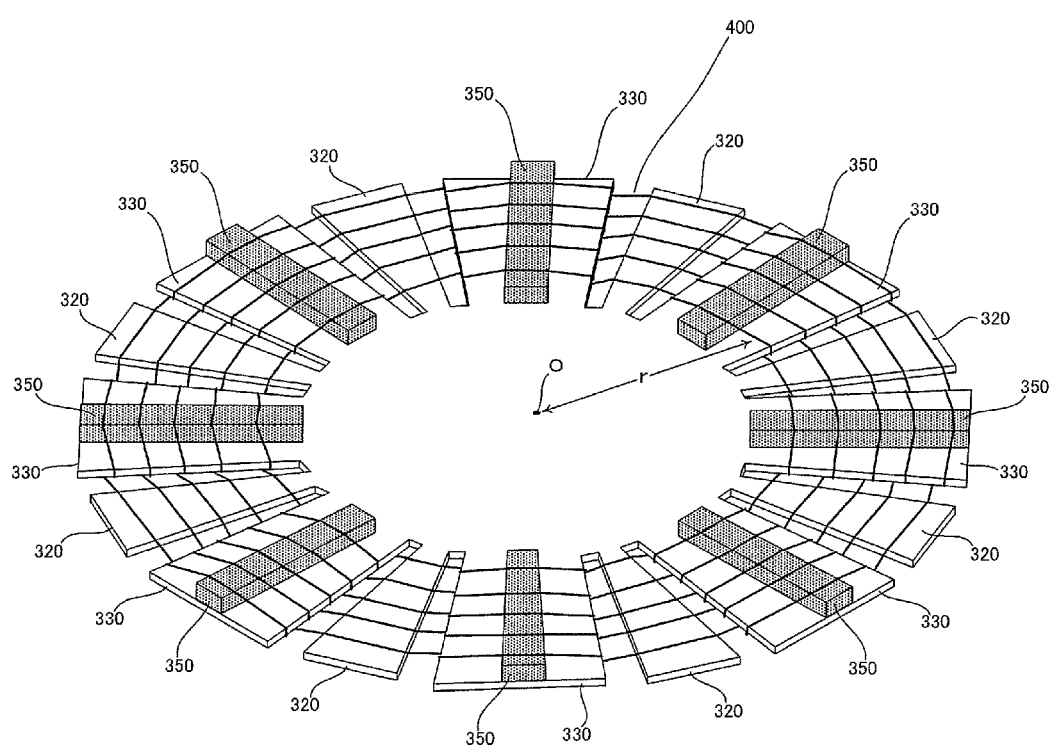
FIG. 10 is a diagram showing an antenna according to an embodiment of the present invention.

FIG. 10 shows the conductive line that is wound around the substrate 300 as described above in such a way as to make almost five laps. FIG. 10 is a diagram showing the antenna according to the embodiment of the present invention. Incidentally, the number of turns, or the number of times the conductive line is wound around the substrate 300, is not limited to this.

The above directional antenna is an antenna having the main coil MC and a plurality of sub-coils SC. The magnetic fields of the main coil MC are corrected by the magnetic fields of a plurality of sub-coils SC. In the case of the above antenna of the present embodiment, even if the antenna is mounted on the bottom surface of the vehicle, it is possible to reduce the magnetic fields entering the metal body of the bottom portion of the vehicle after leaking from the antenna during the transmission of electric power, because the magnetic fields generated from the entire antenna are directional. As a result, it is possible to prevent the heating of the bottom portion of the vehicle and to improve the power transmission efficiency of the system.

Here, in the case of the antenna of the present embodiment, between inductance Lm that is formed by contribution of the main coil MC and inductance Ls that is formed by contribution of all of a plurality of sub-coils SC (or eight sub-coils SC in the example shown in the diagram), it is preferred that relationship Ls≤Lm≤2.5 Ls be established.

When the antenna of the present embodiment is mounted in the bottom portion of the vehicle, and when the power transmission antenna 105 faces the power receiving antenna 201 within a practical range, this relationship between inductance Lm and inductance Ls is for achieving more than a predetermined level of power transmission efficiency.

In order to establish the above relationship, a first method is of adjusting the arrangement of the conductive line 400 that goes around to make the main coil MC. In the case of the winding pattern shown in FIG. 10, the distance between almost the center O of the substrate 300 and the conductive line 400 (or r in FIG. 10) is adjusted in various ways to change inductance Lm. In this manner, the above relationship is satisfied.

A second method is of adjusting the arrangement of the conductive line 400 that goes around to make the sub-coils SC. More specifically, the shape and size of the sub-coil formation protruding pieces 330 are adjusted in various ways to change the winding shape of the conductive line 400 on the sub-coil formation protruding pieces 330, thereby changing inductance Ls. In this manner, the above relationship is satisfied.

A third method is of adjusting the number of times the main coil MC is wound and the number of times the sub-coils SC are wound. In this manner, the above relationship is satisfied.

A fourth method is of adjusting the number of times the main coil MC is wound or the number of times the sub-coils SC are wound. In this manner, the above relationship is satisfied.

The following describes how to adjust the number of times the sub-coils SC are wound, in the case of the winding pattern shown in FIG. 9. For example, in the case of the winding pattern shown in FIG. 9, between (b) and (c), the conductive line 400 is wound around the sub-coil formation protruding piece 330 in such a way as to make almost one and a half laps. For example, to increase inductance Ls of the sub-coil SC, the conductive line 400 may be wound around the sub-coil formation protruding piece 330 in such a way as to make almost two and a half laps. In this manner, inductance Ls of the sub-coil SC can be adjusted.

A fifth method is of providing a magnetic core 350 on an inner peripheral side of the conductor that constitutes the sub-coil SC, or of omitting the magnetic core 350, to change inductance Ls. In this manner, the above relationship is satisfied.

A sixth method is of providing a magnetic core 350 on an inner peripheral side of the conductor that constitutes the sub-coil SC and then adjusting the magnetic permeability of the magnetic core 350 or the size and shape of the magnetic core 350 to change inductance Ls. In this manner, the above relationship is satisfied.

Figure 11:
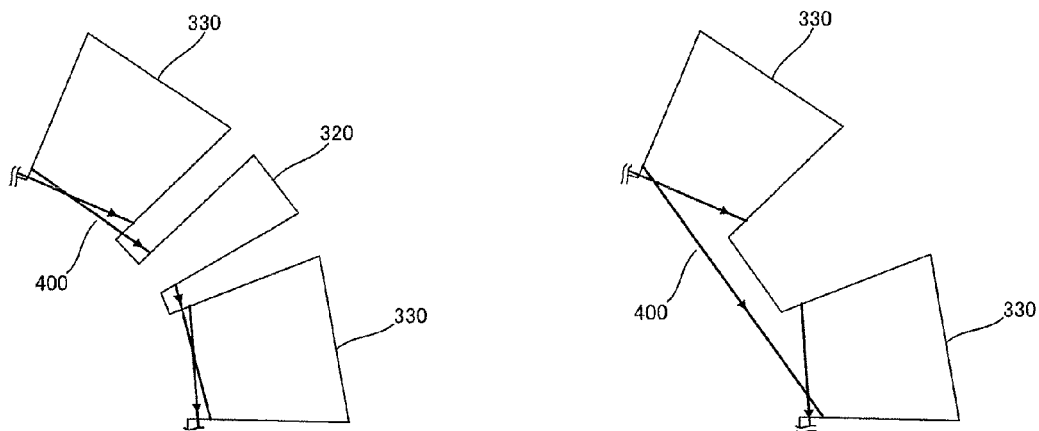
FIG. 11 is a diagram explaining the meaning of providing a main coil formation protruding piece 320.
Figure 11:
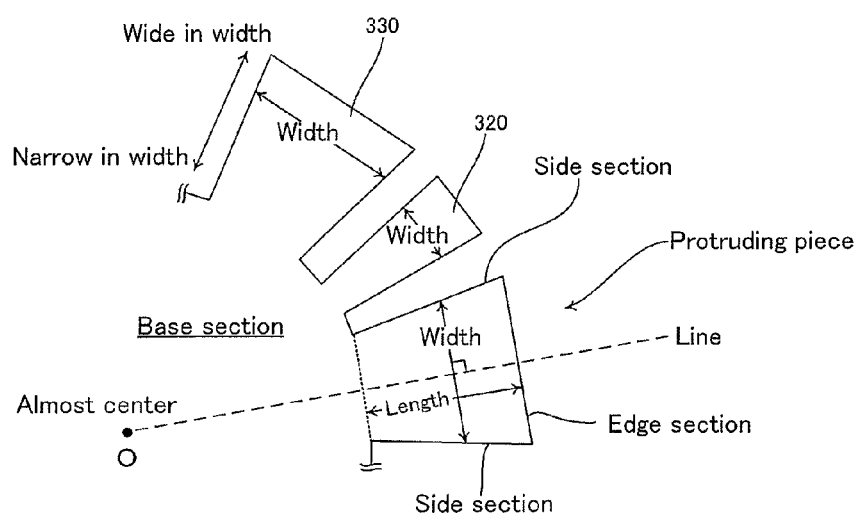

The benefits of providing the main coil formation protruding pieces 320 will be described. FIG. 11 is a diagram explaining the meaning of providing the main coil formation protruding pieces 320. FIG. 11(A) is a diagram illustrating a winding pattern of the antenna of the present embodiment on which the main coil formation protruding pieces 320 are provided. FIG. 11(B) is a diagram illustrating a winding pattern of an antenna of a comparative example on which no main coil formation protruding pieces 320 are provided.

FIG. 11(C) is a diagram explaining definitions of each portion of the substrate 300. A line that is perpendicular to a line going through almost the center O of the substrate 300 and a middle point of an edge section 335 of a main coil formation protruding piece 320 (or sub-coil formation protruding piece 330), or a length that traverses the main coil formation protruding piece 320 (or sub-coil formation protruding piece 330), is defined as "width" of the protruding piece.

A line that goes through almost the center O of the substrate 300 and a middle point of an edge section 335 of a main coil formation protruding piece 320 (or sub-coil formation protruding piece 330), or a distance from an end portion of the base section 310 to the edge section 335, is defined as "length" of the protruding piece.

It is clear from the results of comparison between FIGS. 11(A) and 11(B) that, in the antenna of the present embodiment on which the main coil formation protruding pieces 320 are provided, the shape of the conductive line 400 is closer to a circle formed around almost the center O of the substrate 300. Accordingly, when the main coil formation protruding pieces 320 are provided, it is possible to increase inductance Lm generated by contribution of the main coil MC.

According to the present embodiment, as shown in FIG. 11(C), it is preferred that the width of the main coil formation protruding pieces 320 and sub-coil formation protruding pieces 330 become larger toward the outer peripheral edge of the substrate 300. This configuration helps to further reduce the components of magnetic fields that spread in directions other than the direction perpendicular to the main surface of the substrate 300. Moreover, since a force is generated in such a way as to attract the conductive line 400 toward almost the center O of the substrate 300, the vibration strength of the antenna can be increased.

Figure 12:
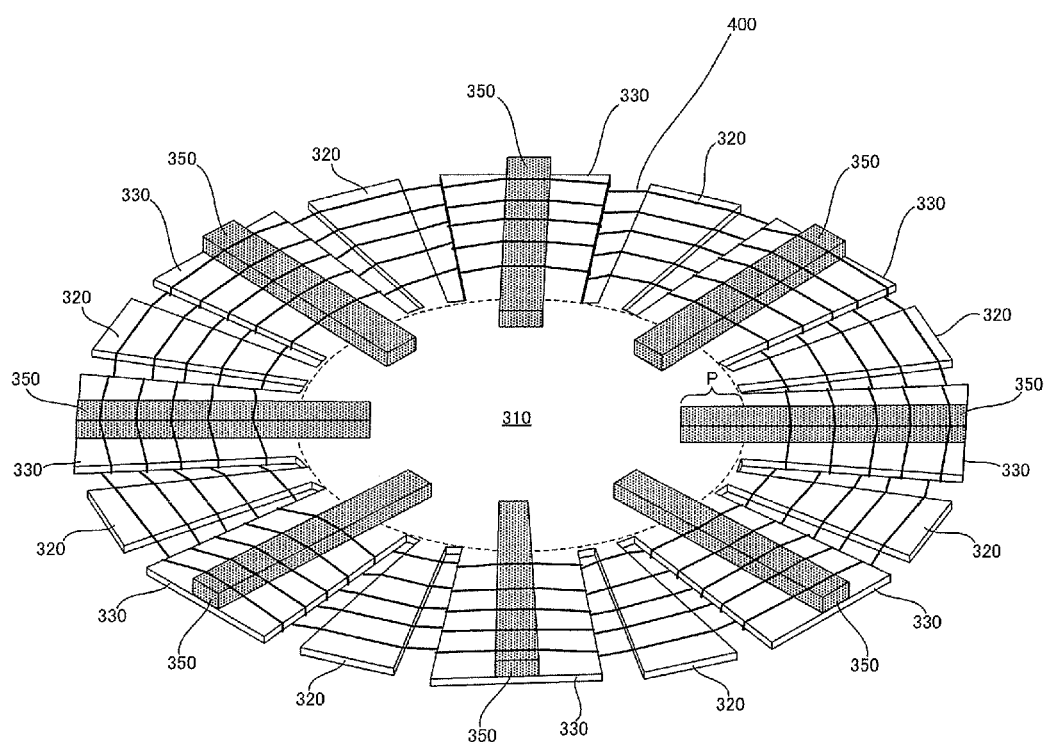
FIG. 12 is a diagram showing an antenna according to another embodiment of the present invention.

Another embodiment of the present invention will be described. FIG. 12 is a diagram showing an antenna according to another embodiment of the present invention.

In the embodiment described above, the length of the magnetic cores 350 is equal to or less than that of the sub-coil formation protruding pieces 330. According to this embodiment, the length of the magnetic cores 350 is set longer than that of the sub-coil formation protruding pieces 330; the magnetic cores 350 are mounted on the sub-coil formation protruding pieces 330 in such a way as to extend toward the base section 310 of the substrate 300. In FIG. 12, a portion of a magnetic core 350 that has extended toward the base section 310 of the substrate 300 is represented by P.

The length and arrangement of the magnetic cores 350 help to reduce the leak of magnetic fields in an area near the center of the substrate 300. Therefore, it is possible to further increase the directivity of the antenna.

Figure 13:
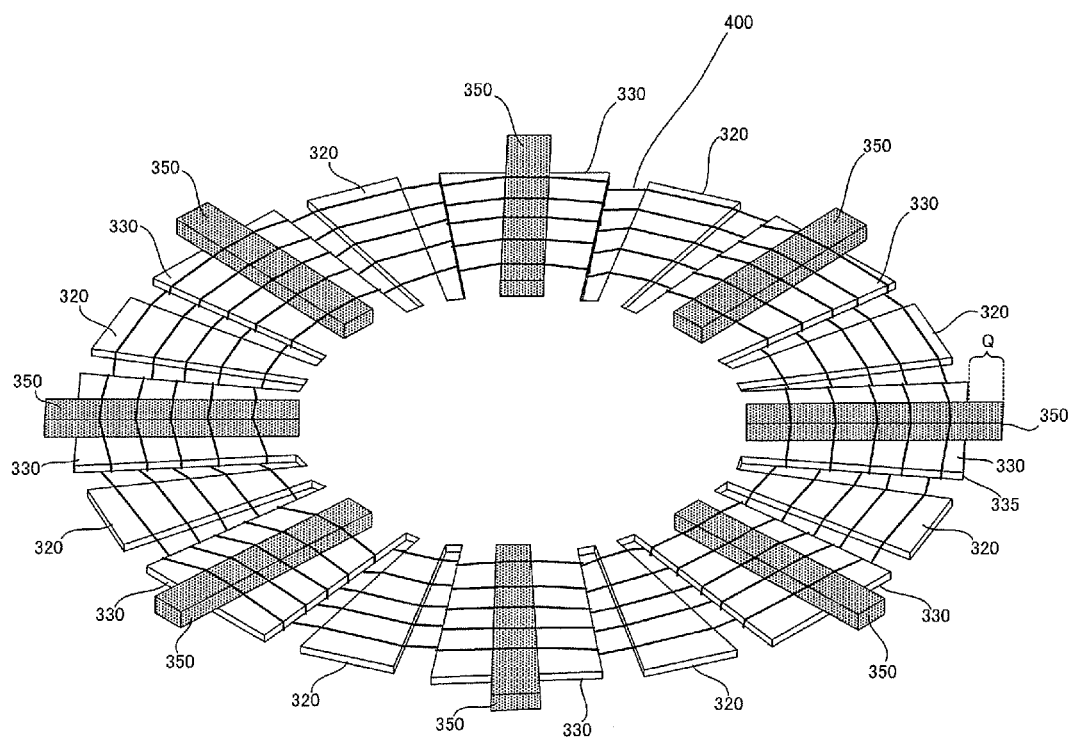
FIG. 13 is a diagram showing an antenna according to another embodiment of the present invention.

FIG. 13 is a diagram showing an antenna according to another embodiment of the present invention. In the embodiment shown in FIG. 13, the length of the magnetic cores 350 is set longer than that of the sub-coil formation protruding pieces 330; the magnetic cores 350 are mounted on the sub-coil formation protruding pieces 330 in such a way as to extend from the edge sections 335 of the sub-coil formation protruding pieces 330. In FIG. 13, a portion of a magnetic core 350 that has extended from an edge section 335 of a sub-coil formation protruding piece 330 is represented by Q.

The length and arrangement of the magnetic cores 350 help to reduce the leak of magnetic fields in an area near the outer peripheral edge of the substrate 300. Therefore, it is possible to further increase the directivity of the antenna.

Incidentally, even in an embodiment in which the embodiments shown in FIGS. 12 and 13 are combined, the directivity of the antenna is expected to be further increased.

In the antenna of the present embodiment, it is preferred that the magnetic cores 350 be prepared as a plurality of separate bodies, and that each magnetic core 350 be mounted on a corresponding sub-coil formation protruding piece 330. It is not preferred that an integrated magnetic core, such as one that is connected at the center of the substrate 300, be used.

Figure 14:
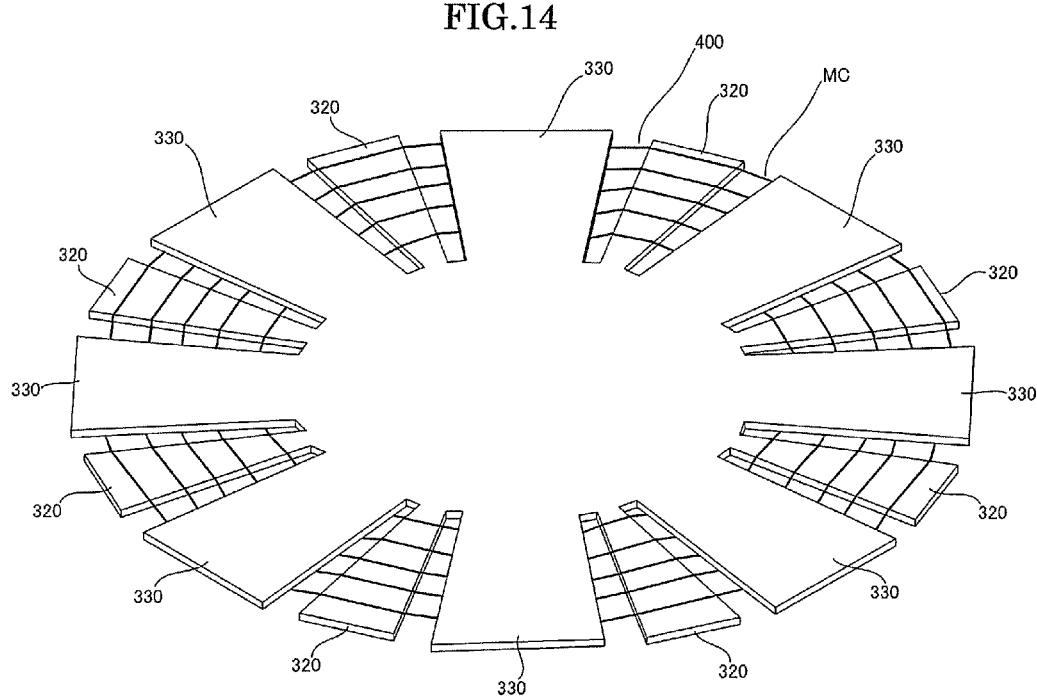
FIG. 14 is a diagram showing an antenna according to another embodiment of the present invention.
Figure 14:
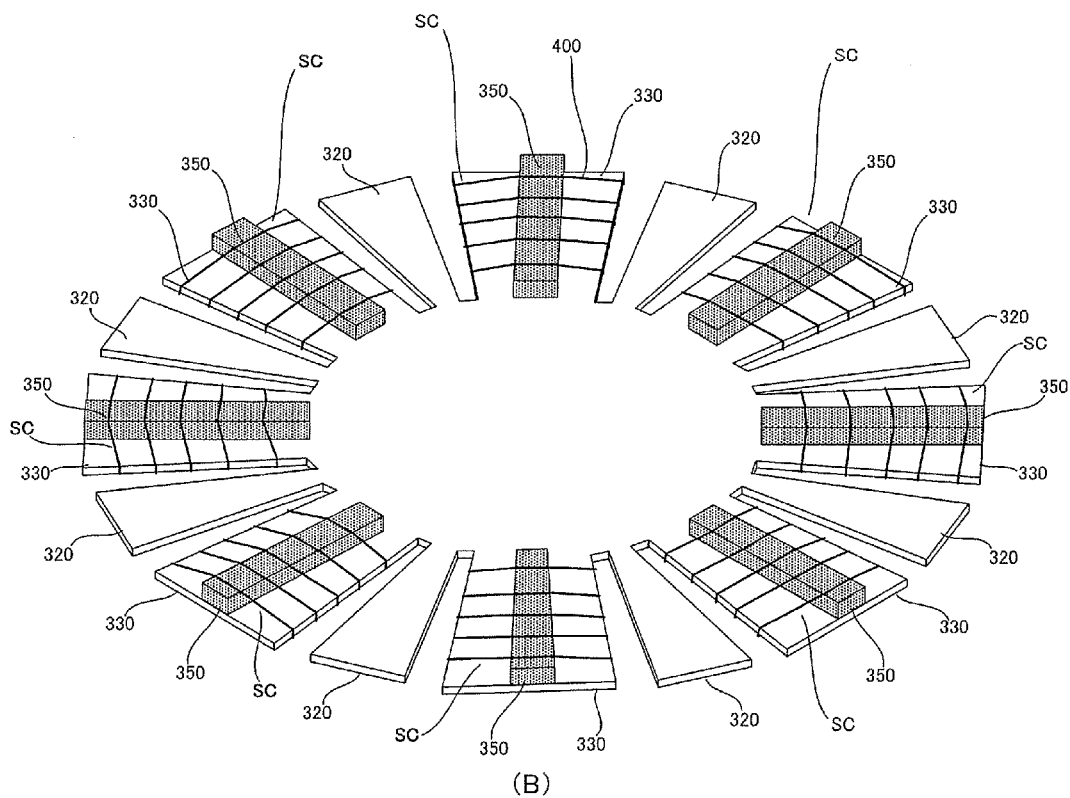

Another embodiment of the present invention will be described. FIG. 14 is a diagram showing an antenna according to another embodiment of the present invention. FIG. 14(A) shows a portion in which a main coil MC of the antenna of the other embodiment is formed. FIG. 14(B) shows a portion in which sub coils SC of the antenna of the other embodiment are formed. The antenna of this embodiment is made by putting together those shown in FIGS. 14(A) and 14(B).

Figure 15:
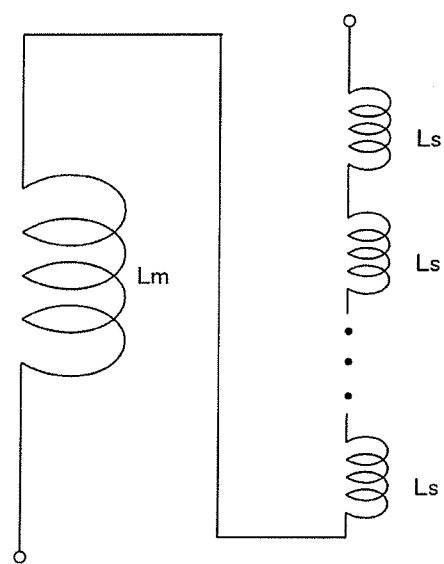
FIG. 15 is a diagram showing an equivalent circuit of an antenna according to another embodiment of the present invention.

FIG. 15 is a diagram showing an equivalent circuit of the antenna according to the other embodiment of the present invention. In FIG. 15, the inductance formed by the main coil MC is represented by Lm, and the inductance formed by individual sub-coils SC is represented by Ls.

In the embodiment described above, one substrate 300 is used, and, in the winding pattern shown in FIG. 9, the main coil MC and sub-coils SC of the antenna are simultaneously formed.

In the embodiment shown in FIGS. 14 and 15, two substrates 300 are used, and the main coil MC and the sub-coils SC are separately formed on the different substrates 300.

In FIG. 14(A), the conductive line 400 is spirally wound as being held by the main coil formation protruding pieces 320 and the sub-coil formation protruding pieces 330. As a result, the main coil MC is formed as shown in the schematic diagram of FIG. 7.

For the formation of the sub-coils SC, only the sub-coil formation protruding pieces 330 are used. In this embodiment, as shown in FIG. 14(B), around the sub-coil formation protruding pieces 330 on which the magnetic cores 350 are mounted, conductive lines 400 are wound. As a result, the sub-coils SC are independently formed on each sub-coil formation protruding piece 330. The sub-coils SC are roughly equivalent to those shown in FIG. 8. The sub-coils SC are connected in series as shown in FIG. 15.

Furthermore, as shown in FIG. 15, the sub-coils SC that are connected in series are connected in series to the main coil MC. Incidentally, as shown in FIG. 15, each coil is connected in such a way as to generate the magnetic fields as described in FIGS. 7 and 8. Furthermore, by putting the main coil MC of FIG. 14(A) on the sub-coils SC of FIG. 14(B) in such a way that the main coil MC is located adjacent to the sub-coils SC, the antenna of the other embodiment is formed. The antenna of the other embodiment can achieve the same advantageous effects as those described in the previous embodiments.

Figure 16:
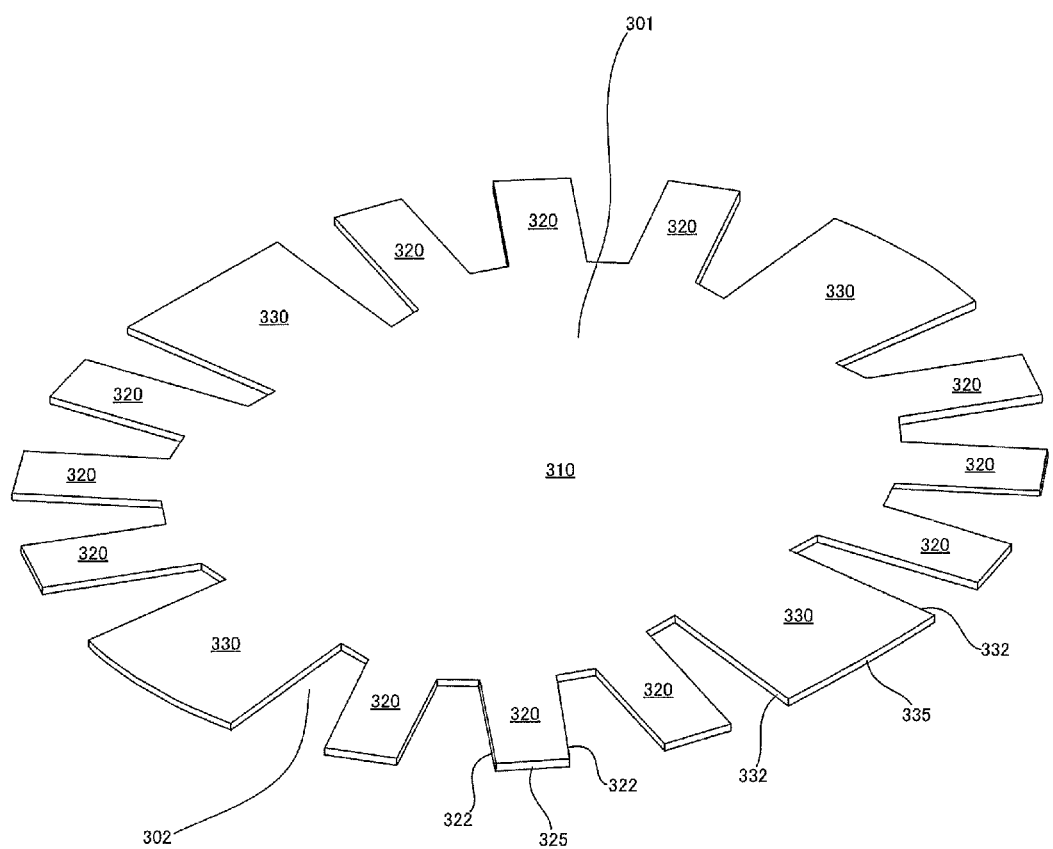
FIG. 16 is a diagram showing a substrate 300 used to form a coil of an antenna according to another embodiment of the present invention.

Another embodiment of the present invention will be described. FIG. 16 is a diagram showing a substrate 300 used to form a coil of an antenna according to another embodiment of the present invention. In FIG. 16, the components indicated by the same reference numbers as in the previous embodiments are the same ones, and will not be described again.

Firstly, the antenna of the other embodiment is different from the antenna of the first embodiment in that, while the main coil formation protruding pieces 320 and the sub-coil formation protruding pieces 330 are alternately arranged on the periphery of the substrate 300 in the antenna of the first embodiment, the protruding pieces are alternately arranged on the periphery of the substrate 300 in the antenna of the other embodiment in such a way that a set of a plurality of successive main coil formation protruding pieces 320 appears after one sub-coil formation protruding piece 330.

In particular, in the antenna of the other embodiment, it is desirable that an odd number of main coil formation protruding pieces 320 be arranged successively on the periphery of the substrate 300. In the embodiment shown in FIG. 16, the number of main coil formation protruding pieces 320 successively arranged is 3.

As described above, if an odd number of main coil formation protruding pieces 320 are arranged successively on the periphery of the substrate 300, the pattern of a conductive line 400 that goes from the first surface 301 to the second surface 302 and from the second surface 302 to the first surface 301 becomes even across the entire circumference of the substrate 300 when the conductive line 400 is wound as shown in FIG. 18, resulting in an improvement in the efficiency of producing the antenna.

Figure 17:
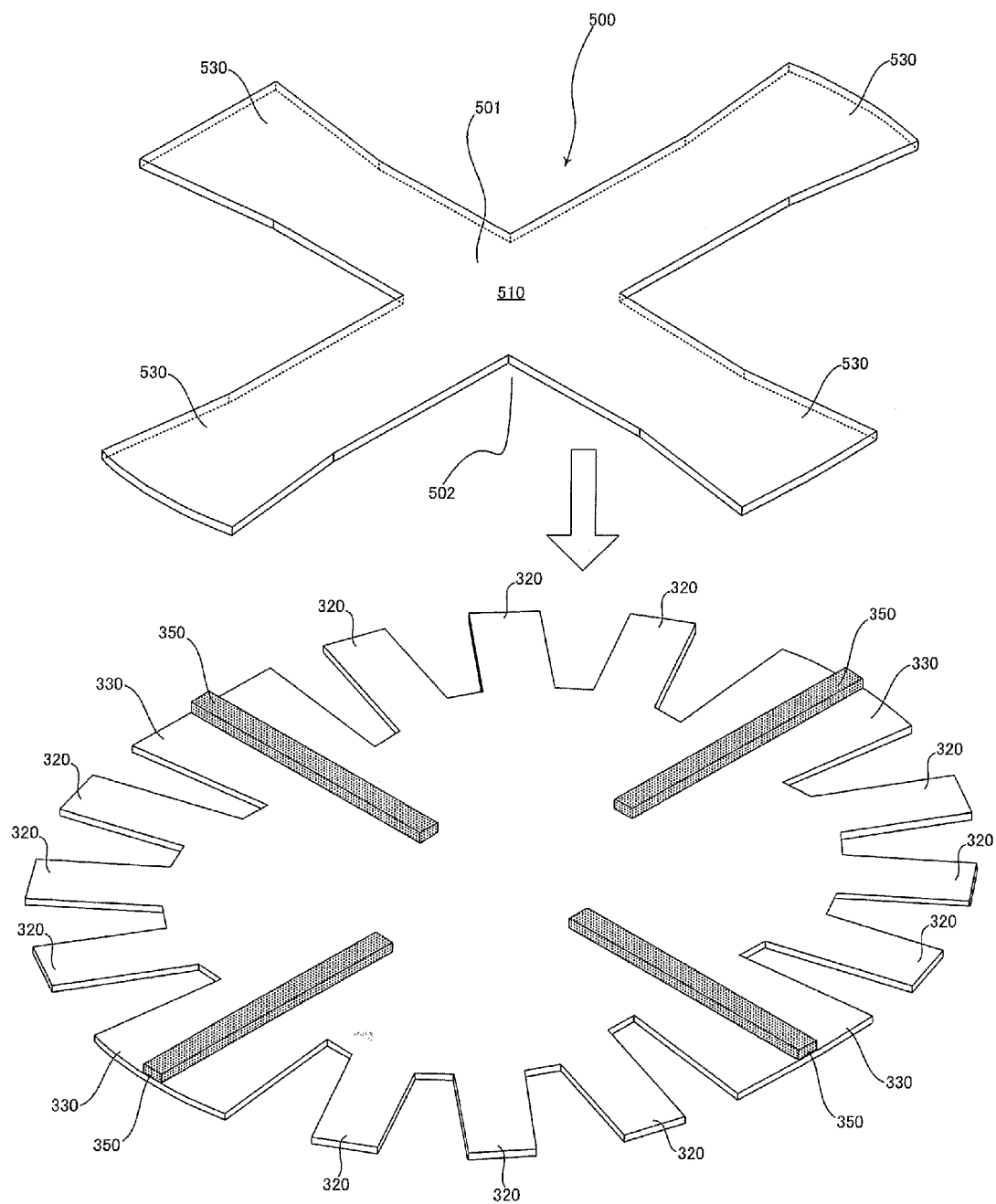
FIG. 17 is a diagram illustrating how a second substrate 500 is mounted in an antenna according to another embodiment of the present invention.

Secondly, the antenna of the other embodiment is different from the antenna of the first embodiment in that a second substrate 500 is used. FIG. 17 is a diagram illustrating how the second substrate 500 is mounted in the antenna according to the other embodiment of the present invention.

As in the case of the substrate 300, the second substrate 500 is a board-like member that includes a first surface 501 and a second surface 502, which is the opposite side thereof. For example, the second substrate 500 is preferably made of a material that is small in dielectric loss tangent, such as polycarbonate or polypropylene.

The second substrate 500 includes a base section 510, which is a plate section that is located at almost the center; and a plurality of sub-coil formation protruding pieces 530, which extend radially from the base section 510. The sub-coil formation protruding pieces 530 of the second substrate 500 are used to hold magnetic cores 350 between the sub-coil formation protruding pieces 530 and the sub-coil formation protruding pieces 330 of the substrate 300, and for winding of a conductive line 400.

As shown in FIG. 17, to the sub-coil formation protruding pieces 330 of the substrate 300, the magnetic cores 350, which are made of a ferromagnetic material such as a ferrite material that is high in magnetic permeability and specific resistance, are attached. Then, the second substrate 500 is put on the magnetic cores 350. In this manner, the magnetic cores 350 are held between the sub-coil formation protruding pieces 330 of the substrate 300 and the sub-coil formation protruding pieces 530 of the second substrate 500.

Furthermore, in the antenna of the other embodiment, around the outer periphery of the sub-coil formation protruding pieces 330 of the substrate 300 and the outer periphery of the sub-coil formation protruding pieces 530 of the second substrate 500, a conductive line 400 is wound. In this manner, the shape of sub-coils SC is maintained. As a result, the distance between the conductive line 400 that constitutes the formed sub-coils SC and the second axis becomes longer than when only the substrate 300 is used, resulting in an increase in inductance components.

The following describes one example of a winding pattern of the conductive line 400 when the main coil MC and sub-coils SC of the antenna of the other embodiment are formed with the substrate 300 and the second substrate 500, with reference to FIG. 18.

In FIG. 18, the arrow indicates the order the conductive line 400 is wound. For example, if the winding of the conductive line 400 starts at (a) in the diagram, the conductive line 400 is held on the first surface 301's side of the main coil formation protruding piece 320 between (a) and (b).

Between (b) and (c), the conductive line 400 is wound around the sub-coil formation protruding piece 330 of the substrate 300 and the sub-coil formation protruding piece 530 of the second substrate 500 in such a way as to make almost one and a half laps, from the second surface of the sub-coil formation protruding piece 330 of the substrate 300 to the first surface of the sub-coil formation protruding piece 530 of the second substrate 500 and then to the second surface of the sub-coil formation protruding piece 330 of the substrate 300.

A coil that is wound around the sub-coil formation protruding piece 330 as described above forms magnetic fields as a sub-coil SC as a whole. A portion of the conductive line 400 that is wound on the second surface's side of the sub-coil formation protruding piece 330 also forms magnetic fields as a main coil MC.

Between (c) and (d), the conductive line 400 is held on the first surface 301's side of a main coil formation protruding piece 320.

Between (d) and (e), the conductive line 400 is held on the second surface 302's side of a main coil formation protruding piece 320.

Between (e) and (f), the conductive line 400 is held on the first surface 301's side of a main coil formation protruding piece 320.

In the winding pattern described above, the conductive line is further wound in the following order: (g)→(h)→(i)→ . . . . The conductive line is wound in the above winding pattern until the conductive line makes one lap around the substrate 300 for all the protruding pieces of the substrate 300 and second substrate 500. After returning to (a), the conductive line is shifted in a direction in which the protruding pieces extend from the base section 310, before being wound around.

The antenna of the other embodiment having the above configuration can achieve the same advantageous effects as the antennas described above. Moreover, the antenna is excellent in productivity because the magnetic core 350 is held between the two protruding pieces. Furthermore, compared with when only the substrate 300 is used, it is possible to increase the inductance components.

As described above, the antenna of this embodiment is an antenna having the main coil MC and a plurality of sub-coils SC; the magnetic fields of the main coil MC are corrected by the magnetic fields of a plurality of sub-coils SC. In the case of the antenna of the present embodiment, even if the antenna is mounted on the bottom surface of the vehicle, it is possible to reduce the magnetic fields entering the metal body of the bottom portion of the vehicle after leaking from the antenna during the transmission of electric power, because the magnetic fields generated from the entire antenna are directional. As a result, it is possible to prevent the heating of the bottom portion of the vehicle and to improve the power transmission efficiency of the system.

The examples of using two types of antennas, i.e., non-directional and directional antennas, have been described. Between a power transmission antenna with an inductance component of $L_1$ and a capacitance component of $C_1$ and a power receiving antenna with an inductance component of $L_2$ and a capacitance component of $C_2$, the following relationships may be established.

[Formula 2]

$$L_1 C_1 = L_2 C_2 \text{ and} \tag{2}$$

[Formula 6]

$$\frac{L_1}{C_1} > \frac{L_2}{C_2} \tag{6}$$

As long as the above relationships are established, any kind of antenna can be used.

For example, in the electric power transmission system 100 of the present invention, an antenna with a spider coil, or an antenna with a solenoid coil that is wound around a bobbin, may also be suitably used. The specific configurations of these antennas will be described. These antennas may be applied to both the power transmission antenna 105 and the power receiving antenna 201. Incidentally, the antenna that transmits electric power using the magnetic resonance method includes not only an inductance component of the coil but also a capacitance component based on floating capacitance thereof or a capacitance component based on a capacitor that is intentionally added.

Figure 19:
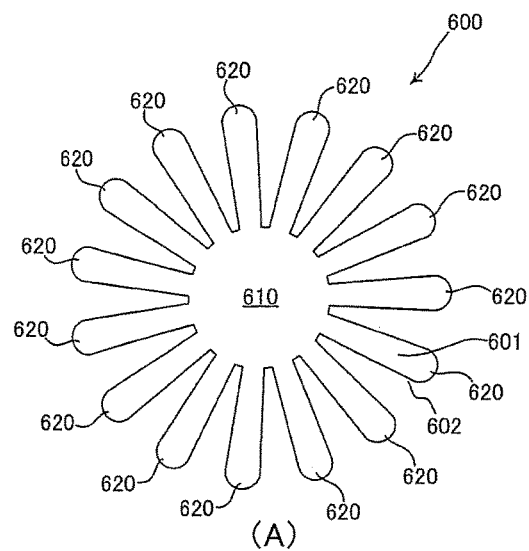
FIG. 19 is a diagram illustrating a spider coil used for an antenna according to another embodiment of the present invention.
Figure 19:
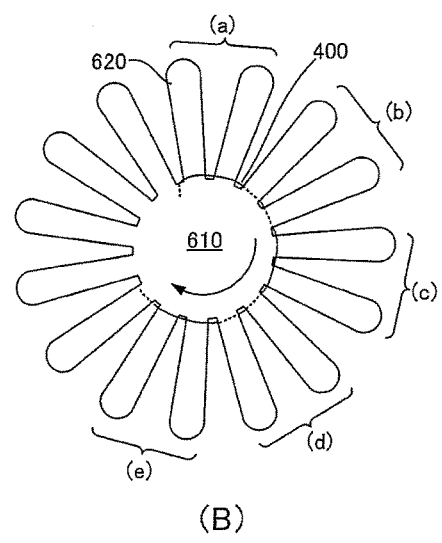
Figure 19:
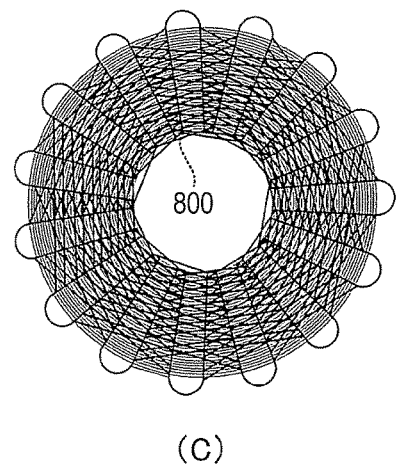

FIG. 19 is a diagram illustrating a spider coil used for an antenna according to another embodiment of the present invention. FIG. 19(A) is a diagram showing a substrate 600 used to form the spider coil. FIG. 19(B) is a diagram showing one example of a pattern when a conductive line 400 is wound on the substrate 600. FIG. 19(C) is a diagram showing the spider coil 800.

In the diagram shown in FIG. 19(A), the substrate 600 that is substantially circular in shape is described as an example. However, the present invention is not limited to this.

The substrate 600 is a board-like member having a first surface 601 and a second surface 602, which is the opposite side thereof. For example, the substrate 600 is preferably made of a material that is small in dielectric loss tangent, such as polycarbonate or polypropylene.

The substrate 600 includes a base section 610, which is a plate section that is substantially circular in shape; and a plurality of coil formation protruding pieces 620, which extend radially from the base section 610.

A conductive line 400 goes across either the first surface 601 or second surface 602 of a coil formation protruding piece 620. The coil formation protruding piece 620 is used to hold the conductive line 400. Therefore, the shape of the spider coil is maintained by the conductive line 400.

One example of a winding pattern of the conductive line 400 when the coil is formed with the above substrate 600 will be described with reference to FIG. 19(B). The conductive line 400 is preferably a stranded wire, or a group of a plurality of conductor wires.

In FIG. 19(B), the arrow indicates the order the coil is wound. For example, if the conductive line 400 starts to be wound as the conductive line 400 is put on coil formation protruding pieces 620 shown at (a) in the diagram, the conductive line 400 is held on the first surface 601's sides of the coil formation protruding pieces 620 in the area of the two coil formation protruding pieces 620 shown at (a).

Then, in the area of two coil formation protruding pieces 620 shown at (b), the conductive line 400 is held on the second surface 602's sides of the coil formation protruding pieces 620.

In the area of two coil formation protruding pieces 620 shown at (c), the conductive line 400 is held on the first surface 601's sides of the coil formation protruding pieces 620.

As described above, according to this winding pattern, each time the conductive line 400 is wound around a different set of two coil formation protruding pieces 620, the first surface 601's sides and the second surface 602's sides are alternately switched to hold the conductive line 400. In this winding pattern, the conductive line 400 is wound in the following order: (c)→(d)→(e)→ . . . . This winding pattern makes it possible to form an antenna with a large inductance component L.

When an antenna with a large inductance component L is to be formed, the first surface 601's sides and the second surface 602's sides are alternately switched to hold the conductive line 400 each time the conductive line 400 is wound around a different coil formation protruding piece 620, according to a preferred winding pattern.

FIG. 19(C) is a diagram showing the spider coil 800 that is used for an antenna according to another embodiment of the present invention. Such an antenna may be used as the power transmission antenna 105 or the power receiving antenna 201 to realize the present invention.

Figure 20:
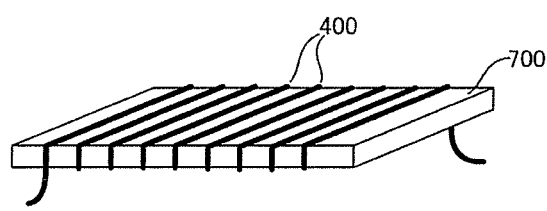
FIG. 20 is a diagram illustrating a solenoidal coil used for an antenna according to another embodiment of the present invention.
Figure 20:
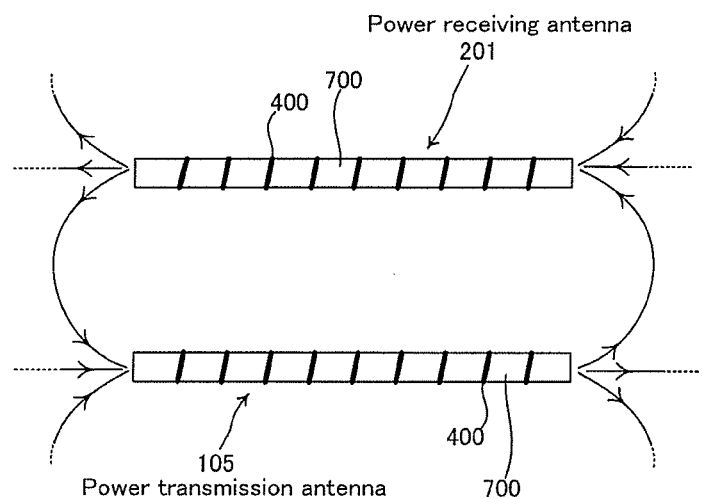

FIG. 20 is a diagram illustrating a solenoidal coil used for an antenna according to another embodiment of the present invention. FIG. 20(A) is a perspective view of the solenoidal coil. FIG. 20(B) is a diagram illustrating how the present invention is realized by using the antennas with the solenoidal coils as the power transmission antenna 105 and the power receiving antenna 201.

A bobbin 700 is used to form a conductive line 400 into a solenoidal coil as the conductive line 400 is wound around the bobbin 700. The bobbin 700 may be made of a rigid material that is small in dielectric loss tangent, such as polycarbonate, polypropylene, or ABS resin.

According to the present embodiment, antennas that include the solenoidal coils wound around the bobbins 700 may be disposed in such a way as to face each other, as shown in FIG. 20(B). These antennas may be used as the power transmission antenna 105 and the power receiving antenna 201 to realize the present invention.

Another embodiment of the present invention will be described. In the above-described embodiments, the relationship between the impedance of the power transmission antenna 105 and the impedance of the power receiving antenna 201 is described. The embodiment described below will also refer to the relationship with the internal impedance of the battery 204.

A condition for efficiently charging the battery 204 in the power receiving-side system is that the impedance of the power receiving antenna 201 is matched to the impedance of the battery 204.

That is, in the present embodiment, in addition to the conditions of the formulae (2) and (6), between the impedance of the power receiving antenna 201 of the formula (4) and impedance R of the battery 204, the following relationship is established.

[Formula 7]

$$R = k\sqrt{\frac{L_2}{C_2}} \quad (7)$$

The above relationship enables efficient transmission of electric power as the entire system when the battery 204 is charged in the power receiving-side system.

Incidentally, in the appended claims, the battery 204 is expressed as a load, and impedance R of the battery 204 as a load resistance value.

Another embodiment of the present invention will be described. If impedance R of the battery 204 remains substantially unchanged and is thus regarded as a constant as described above, the efficient transmission of electric power is possible as long as the conditions of the formulae (2), (6), and (7) are satisfied as in the case of the above embodiment. If the impedance of the battery 204 is varied, here is a way to handle the variation.

That is, in the present embodiment, if the battery 204 is used in a range where impedance R of the battery 204 satisfies $R_{min} \leq R \leq R_{max}$, in addition to the conditions of the formulae (2) and (6), between the impedance of the power receiving antenna 201 of the formula (4) and impedance R of the battery 204, the following relationship is established.

[Formula 8]

$$R_{min} \leq k\sqrt{\frac{L_2}{C_2}} \leq R_{max} \quad (8)$$

The above relationship enables efficient transmission of electric power as the entire system when the battery 204 is charged in the power receiving-side system.

Another embodiment of the present invention will be described. As in the case of the above embodiment, if the impedance of the battery 204 is varied, the impedance of the power receiving antenna 201 is determined in the following manner to improve robustness of the system.

That is, in the present embodiment, if the battery 204 is used in a range where impedance R of the battery 204 satisfies $R_{min} \leq R \leq R_{max}$, in addition to the conditions of the formulae (2) and (6), between the impedance of the power receiving antenna 201 of the formula (4) and impedance R of the battery 204, the following relationship is established.

[Formula 9]

$$k\sqrt{\frac{L_2}{C_2}} = \frac{R_{min} + R_{max}}{2} \quad (9)$$

The above relationship enables efficient transmission of electric power as the entire system when the battery 204 is charged in the power receiving-side system. Furthermore, in the case of the present embodiment, as the impedance of the power receiving antenna 201 of the formula (4), an average value of impedance R of the battery 204 is adopted. In this manner, the robustness is increased against a change in factors, such as a positional change between the power transmission antenna 105 and the power receiving antenna 201.

Another embodiment of the present invention will be described. What will be described is a preferred embodiment for the case where there are modes in which different values of electric power are used in the transmission of electric power from the power transmission-side system to the power receiving-side system.

Suppose that there are a first mode, in which electric power is transmitted with a first power value from the power transmission antenna 105 to the power receiving antenna 201, and a second mode, in which electric power is transmitted with a second power value from the power transmission antenna 105 to the power receiving antenna 201. If the impedance of the battery 204 is $R_1$ during the first-mode power transmission, and if the impedance of the battery 204 is $R_2$ during the second-mode power transmission, in the case of the present embodiment, in addition to the conditions of the formulae (2) and (6), between the impedance of the power receiving antenna 201 of the formula (4) and impedance R of the battery 204, the following relationship is established.

[Formula 10]

$$k\sqrt{\frac{L_2}{C_2}} = \frac{R_1 + R_2}{2} \quad (10)$$

The above relationship enables efficient transmission of electric power as the entire system when the battery 204 is charged in the power receiving-side system.

In the case of the present embodiment, as the impedance of the power receiving antenna 201 of the formula (4), an average value of impedance $R_1$ of the battery 204 for the first-mode power transmission and of impedance $R_2$ of the battery 204 for the second-mode power transmission is adopted, resulting in an improvement in the robustness against a change between the modes.

Another embodiment of the present invention will be described. In the previous embodiment, what is described is the case where there are two modes in transmitting electric power from the power transmission antenna 105 to the power receiving antenna 201. In this embodiment, what will be described is the case where there are n modes for the power transmission.

If there are n modes for the power transmission, the situation can be generalized as described below. Suppose that there are n modes in which different values of electric power are used to transmit electric power from the power transmission antenna 105 to the power receiving antenna 201, and that the impedance of the battery 204 during the $h^{th}$-mode (h=1, 2, ..., n) power transmission is $R_h$, in the case of the present embodiment, in addition to the conditions of the formulae (2) and (6), between the impedance of the power receiving antenna 201 of the formula (4) and impedance R of the battery 204, the following relationship is established.

[Formula 11]

$$k\sqrt{\frac{L_2}{C_2}} = \frac{\sum_{h=1}^{n} R_h}{n} \quad (11)$$

The above relationship enables efficient transmission of electric power as the entire system when the battery 204 is charged in the power receiving-side system.

Incidentally, if the premise of the above is that a maximum impedance $R_h$ is represented by $R_{hmax}$ and a minimum impedance $R_h$ by $R_{hmin}$, the following relationship may be established.

[Formula 12]

$$R_{hmin} \leq k\sqrt{\frac{L_2}{C_2}} \leq R_{hmax} \quad (12)$$

It is preferred that the above relationship be satisfied.

In the present embodiment, as the impedance of the power receiving antenna 201 of the formula (4), an average value of impedance of the battery 204 used in each of the power-transmission modes is adopted, resulting in an improvement in the robustness against a change between the modes.

As described above, the following relationship may be established between the power transmission antenna 105 of the formula (3) and impedance of the power receiving antenna 201 of the formula (4).

[Formula 5]

$$k\sqrt{\frac{L_1}{C_1}} > k\sqrt{\frac{L_2}{C_2}} \quad (5)$$

The above relationship is suitable for the efficiency of power transmission. Even if the value of impedance of the power transmission antenna 105 of the formula (3) is raised, an upper limit thereof is determined depending on the configuration of the electric power transmission system.

More specifically, based on a breakdown voltage of the switching elements that make up the inverter unit 103 and a value of electric power transmitted from the power transmission antenna 105, an upper limit of the following formula is determined.

[Formula 3]

$$k\sqrt{\frac{L_1}{C_1}} \quad (3)$$

In this manner, the upper limit may be determined.

As the breakdown voltage of the switching elements of the above inverter unit 103, one criterion to be used may be 90% of the allowable voltage of the switching elements. However, if the transmission of electric power should be more safely conducted in the electric power transmission system, the breakdown voltage may be set to 70% of the allowable voltage of the switching elements.

Figure 21:
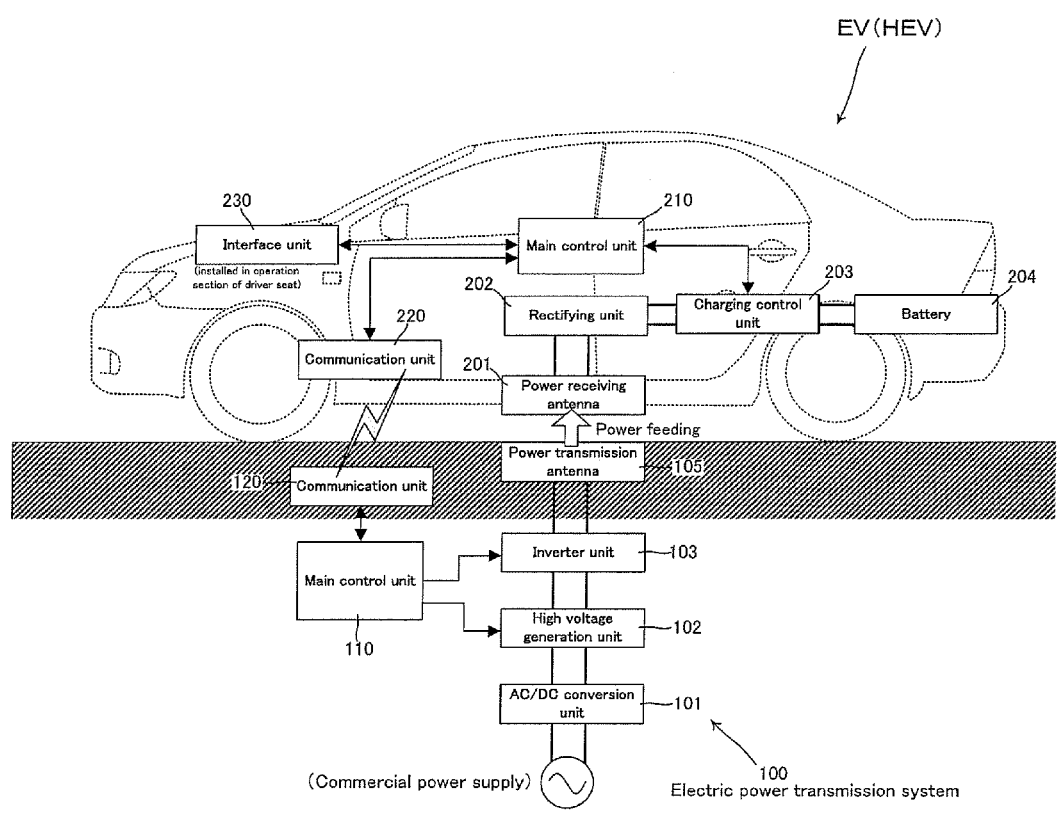
FIG. 21 is a block diagram of an electric power transmission system according to another embodiment of the present invention.

Another embodiment of the present invention will be described. FIG. 21 is a block diagram of an electric power transmission system according to another embodiment of the present invention.

This embodiment is different from that of FIG. 1 in that the system of the present embodiment does not have a matching unit. According to the present embodiment, the output of the inverter unit 103 is input directly to the power transmission antenna 105, and the output of the power receiving antenna 201 is input directly to the rectifying unit 202.

According to the configuration of the other embodiment shown in FIG. 21, without the need for circuit sections such as a matching unit, by adjusting only the inductance and capacitance components of the power transmission antenna 105 and power receiving antenna 201, electric power can be efficiently transmitted. Therefore, the costs of the system can be reduced.

As described above, in the electric power transmission system of the present invention, the circuit constants of the power transmission antenna and power receiving antenna are set in such away as to satisfy the above formulae (2), (6), and (7). Therefore, when the battery 204 is charged in the power receiving-side system, electric power can be efficiently transmitted.

Moreover, in the electric power transmission system of the present invention, even when the power receiving antenna is mounted on the bottom surface of the vehicle, it is possible to reduce the magnetic fields entering the metal body of the bottom portion of the vehicle after leaking from the power receiving antenna during the transmission of electric power, because at least the power receiving antenna is directional. As a result, it is possible to prevent the heating of the bottom portion of the vehicle and to improve the power transmission efficiency of the system.

INDUSTRIAL APPLICABILITY

The electric power transmission system of the present invention is suitably used in a magnetic resonance-type wireless electric power transmission system that charges vehicles, such as electric vehicles (EV) or hybrid electric vehicles (HEV), which have rapidly become popular in recent years. When the magnetic resonance-type electric power transmission system is applied to a process of charging vehicle-mounted batteries such as those of electric vehicles (EV) or hybrid electric vehicles (HEV), a load on the power receiving side is a battery. However, in the case of conventional techniques, a battery was not expected to be used as a load on the power receiving side during the efficient transmission of electric power. In the electric power transmission system of the present invention, the circuit constants of the power transmission antenna and power receiving antenna are set in such a way as to satisfy specific relational formulae. Therefore, when the battery is charged in the power receiving-side system, electric power can be efficiently transmitted. Thus, the system is very high in industrial applicability.

EXPLANATION OF REFERENCE SYMBOLS

100: Electric power transmission system
101: AC/DC conversion unit
102: Voltage adjustment unit
103: Inverter unit
104: Matching unit
105: Power transmission antenna
110: Main control unit
120: Communication unit
201: Power receiving antenna
202: Rectifying unit
203: Charging control unit
204: Battery
210: Main control unit
220: Communication unit
230: Interface unit
260: Case body
216: Bottom plate section
262: Side plate section
263: (Upper) opening
265: Vehicle body mounting section
270: Coil body
271: Base
272: Conductive section
273: First end portion
274: Second end portion
280: Ferrite substrate
290: Aluminum substrate
300: Substrate
301: First surface
302: Second surface
310: Base section
320: Main coil formation protruding piece
322: Side section
325: Edge section
330: Sub-coil formation protruding piece
332: Side section
335: Edge section
350: Magnetic core
400: Conductive line
500: Second substrate
501: First surface
502: Second surface
510: Base section
530: Sub-coil formation protruding piece
600: Substrate
601: First surface
602: Second surface
610: Base section
620: Coil formation protruding piece
700: Bobbin

The invention claimed is:

1. An electric power transmission system, comprising:
a power transmission antenna that constitutes a series resonator with an inductance component of $L_1$ and a capacitance component of $C_1$, and to which AC power is input;
an inverter unit that converts DC voltage to AC voltage of a predetermined frequency to output to the power transmission antenna, the output of the inverter unit being input directly to the series resonator of the power transmission antenna;
a power receiving antenna that constitutes a series resonator electromagnetically coupled to the series resonator of the power transmission antenna, the series resonator of the power receiving antenna having an inductance component of $L_2$ and a capacitance component of $C_2$, and which receives electromagnetic energy from the series resonator of the power transmission antenna via electromagnetic fields;

a rectifying unit that rectifies an output of the power receiving antenna to output DC power; and a load to which an output of the rectifying unit is input, wherein the following relationships are established:

$$L_1 C_1 = L_2 C_2 \qquad \text{(Formula 2)};$$

and $$L_1/C_1 > L_2/C_2 \qquad \text{(Formula 6)},$$

wherein and a coupling coefficient between the power transmission antenna and the power receiving antenna is denoted as k, the resistance value of the load is denoted by R, where the resistance value of the load R varies from a minimum resistance value of $R_{min}$ to a maximum resistance value of $R_{max}$, and the following relationship is established:

$$R_{min} \leq k\sqrt{\frac{L_2}{C_2}} \leq R_{max}. \qquad \text{(Formula 8)}$$

2. The electric power transmission system according to claim 1, wherein $$k\sqrt{\frac{L_2}{C_2}} = \frac{R_{min} + R_{max}}{2}. \qquad \text{(Formula 9)}$$

3. The electric power transmission system according to claim 1, wherein the power transmission antenna is non-directional.

4. The electric power transmission system according to claim 1, wherein the power receiving antenna is directional.

5. An electric power transmission system, comprising:

a power transmission antenna that constitutes a series resonator with an inductance component of $L_1$ and a capacitance component of $C_1$, and to which AC power is input;

an inverter unit that converts DC voltage to AC voltage of a predetermined frequency to output to the power transmission antenna, the output of the inverter unit being input directly to the series resonator of the power transmission antenna;

a power receiving antenna that constitutes a series resonator electromagnetically coupled to the series resonator of the power transmission antenna, the series resonator of the power receiving antenna having an inductance component of $L_2$ and a capacitance component of $C_2$, and which receives electromagnetic energy from the series resonator of the power transmission antenna via electromagnetic fields;

a rectifying unit that rectifies an output of the power receiving antenna to output DC power; and a load to which an output of the rectifying unit is input, wherein the following relationships are established:

$$L_1 C_1 = L_2 C_2 \qquad \text{(Formula 2)}$$

and $$L_1/C_1 > L_2/C_2 \qquad \text{(Formula 6)},$$

wherein a coupling coefficient between the power transmission antenna and the power receiving antenna is denoted as k, there are n modes of power transmission where the load has a resistance value of $R_h$ in an $h^{th}$ mode, where h is an integer ranging from 1 to n, the resistance value of the load among the n modes varies from a minimum resistance value of $R_{hmin}$ to a maximum resistance value of $R_{hmax}$, and the following relationship is established:

$$R_{hmin} \leq k\sqrt{\frac{L_2}{C_2}} \leq R_{hmax}. \qquad (12)$$

6. The electric power transmission system according to claim 5, wherein $$k\sqrt{\frac{L_2}{C_2}} = \frac{\sum_{h=1}^{n} R_h}{n}. \qquad \text{(Formula 11)}$$

* * * * *